(12) United States Patent
Standish

(10) Patent No.: US 11,358,891 B2
(45) Date of Patent: Jun. 14, 2022

(54) TREATMENT OF AQUEOUS SYSTEMS

(71) Applicant: Radical Polymers, LLC, Chattanooga, TN (US)

(72) Inventor: Michael Lee Standish, Chattanooga, TN (US)

(73) Assignee: Radical Polymers, LLC, Chattanooga, TN (US)

( * ) Notice: Subject to any disclaimer, the term of this patent is extended or adjusted under 35 U.S.C. 154(b) by 0 days.

(21) Appl. No.: 15/937,990

(22) Filed: Mar. 28, 2018

(65) Prior Publication Data

US 2018/0215638 A1 Aug. 2, 2018

Related U.S. Application Data

(62) Division of application No. 14/525,216, filed on Oct. 28, 2014, now abandoned.

(51) Int. Cl.
| | | |
|---|---|---|
| *C02F 5/10* | (2006.01) | |
| *C02F 101/10* | (2006.01) | |
| *C08F 222/02* | (2006.01) | |
| *C08F 222/04* | (2006.01) | |

(52) U.S. Cl.
CPC ............. *C02F 5/10* (2013.01); *C08F 222/02* (2013.01); *C08F 222/04* (2013.01); *C02F 2101/10* (2013.01); *C02F 2101/101* (2013.01); *C02F 2101/105* (2013.01)

(58) Field of Classification Search
USPC ........... 210/701, 700; 252/180–181; 507/227
See application file for complete search history.

(56) References Cited

U.S. PATENT DOCUMENTS

| | | | | |
|---|---|---|---|---|
| 4,089,796 A | * | 5/1978 | Harris | C02F 5/105 210/698 |
| 5,135,677 A | * | 8/1992 | Yamaguchi | C02F 5/14 526/272 |
| 5,866,032 A | * | 2/1999 | Carey | C02F 5/14 252/396 |
| 6,333,005 B1 | * | 12/2001 | Nguyen | C02F 5/00 422/18 |
| 6,365,101 B1 | * | 4/2002 | Nguyen | C02F 5/00 422/18 |
| 7,300,542 B2 | * | 11/2007 | Thompson | D21C 3/226 162/29 |

(Continued)

OTHER PUBLICATIONS

Restriction Requirement dated Oct. 31, 2016 in U.S. Appl. No. 14/525,216 (This application is a Division of U.S. Appl. No. 14/525,216).

(Continued)

*Primary Examiner* — Nina Bhat
(74) *Attorney, Agent, or Firm* — Wolter VanDyke Davis PLLC; Michael Byrne

(57) ABSTRACT

A method is described for selecting a treatment additive for aqueous systems, in which crystal habit modification properties are prioritized; for aqueously preparing a substantially poly-maleic additive through in-situ formation of maleic acid copolymer so that mono-carboxylic acids, non-ionic functional groups, and terminal hydroxyl groups are also formed during polymerization; and for applying such additives for treatment of aqueous systems. Treatment agents resulting from these processes are also described.

11 Claims, 36 Drawing Sheets

(56) References Cited

U.S. PATENT DOCUMENTS

| | | | | |
|---|---|---|---|---|
| 2002/0150499 A1* | 10/2002 | Reizer | .................... | C09K 8/528 |
| | | | | 422/15 |
| 2003/0173303 A1* | 9/2003 | Austin | ...................... | C02F 5/10 |
| | | | | 210/698 |
| 2005/0282712 A1* | 12/2005 | Crossman | ................. | C02F 5/04 |
| | | | | 507/227 |
| 2009/0069202 A1* | 3/2009 | Stapp | ...................... | C02F 5/083 |
| | | | | 507/224 |
| 2010/0163494 A1* | 7/2010 | Bodnar | ..................... | C02F 5/12 |
| | | | | 252/180 |
| 2013/0005639 A1* | 1/2013 | Miralles | ................. | C11D 3/225 |
| | | | | 510/471 |
| 2016/0176735 A1* | 6/2016 | Balasubramanian | ..... | C02F 1/50 |
| | | | | 210/729 |

OTHER PUBLICATIONS

Non-Final Office Action dated May 5, 2017 in U.S. Appl. No. 14/525,216 (This application is a Division of U.S. Appl. No. 14/525,216).

Final Office Action dated Dec. 28, 2017 in U.S. Appl. No. 14/525,216 (This application is a Division of U.S. Appl. No. 14/525,216).

* cited by examiner

| MONOMER FUNCTIONAL GROUP | TYPE OF MINERAL SCALE | | | | | |
|---|---|---|---|---|---|---|
| | CaCO$_3$ | CaSO$_4$ | Ca$_x$(PO$_4$)$_y$ | Iron | Zinc | Organics | Salt Stab |
| Carboxylate | +++ | ++ | - | - | - | - | ++ MA -AA |
| Sulfonate | - | + | +++ | +++ | +++ | - | + Conc. Dependant |
| Non-Ionic | ++ Crystal Mod. - Threshold Chelation | - | +++ | + | - | +++ | + |

FIG. 6

| Condition | Value |
|---|---|
| Calcium Concentration | 600 mg/l Ca²⁺ Solution (Using CaCl₂ • 2H₂O) |
| Carbonate Concentration | 600 mg/l CO₃²⁻ Solution (Using Na₂CO₃•H₂O) |
| Sample pH | ~9.5-10.2 |
| Temperature | 70°C |
| Duration of Heating | 18 Hours |
| Polymer Dosage | 15 mg/l and 30 mg/l as Active (as indicated in images) |
| Calcite Saturation (IAP/Ksp) | 857.45 at pH 9.5 |
| Calculated Free Calcium | 218.0 mg/l |
| Calculated Free Carbonate | 62.5 mg/l |
| Langelier Saturation Index (LSI) | >3.0 (Calculated to be 4.3) |
| Ryznar Stability Index (RSI) | 0.90 |

FIG. 8

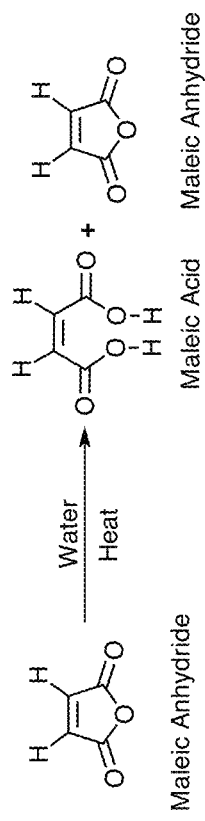
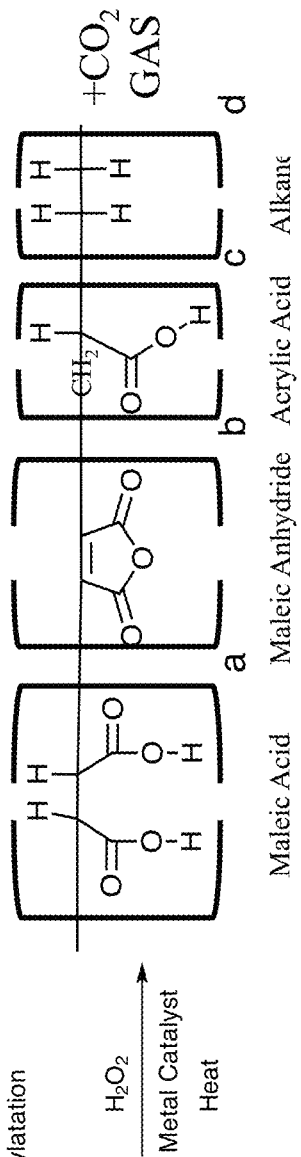
FIG. 17 – ENHANCED COPOLYMER – PREFERRED EMBODIMENT

TREATMENT OF AQUEOUS SYSTEMS

CROSS REFERENCE TO RELATED APPLICATIONS

The present application claims priority to and is a divisional application of U.S. application Ser. No. 14/525,216, filed Oct. 28, 2014.

BACKGROUND OF THE INVENTION

The present invention relates to treating aqueous systems to prevent or remediate problems of mineral scale deposition and buildup. Fields of expected application include, without limitation, water treatment, industrial aqueous systems treatment, cooling water systems, boiler operation, thermal and reverse osmosis desalination activities, gas and oilfield operations, municipal and wastewater treatment, pulp and paper processes, and detergent/cleaning applications.

Various types of contaminants in an aqueous system under a variety of conditions can cause problems such as corrosion, microbiological contamination, or mineral scaling, in which contaminants precipitate out of solution in the system and form undesirable scale deposits on system surfaces. Of particular interest to the present invention is the challenge of scale management. Polymer mediated scale control techniques historically involve a variety of mechanisms that are generally known in the art, including, for example, threshold inhibition, sequestration, chelation, stabilization, particulate dispersion, and crystal habit modification. These mechanisms are discussed and defined below.

Threshold inhibition involves extending the solubility of an otherwise insoluble salt beyond normal saturation limits using an additive which functions at sub-stoichiometric levels. This sub-stoichiometric functionality differentiates treatment additives such as polymers and phosphonates from materials that function according to strict stoichiometric ratios such as Ethylenediaminetetraacetic acid (EDTA). Threshold inhibition is often a temporary effect. For example, if uninhibited water takes 60 seconds to begin precipitating calcium carbonate in a given set of conditions (such as pH, temperature, concentrations of calcium and carbonate, etc.), the same water may be treated to extend this time to one hour through a threshold inhibition additive. The extent and duration of threshold inhibition may be related to a variety of factors or conditions, including without limitation the driving forces for precipitation (pH, temperature, concentrations of scale-forming ions, etc.), the particular efficacy of a selected threshold inhibition additive, other water impurities (dissolved or suspended), rate of water concentration or evaporation, and frequency of additive dosage.

Sequestration can be another important function of treatment additives, particularly of many polymers and phosphonates. Sequestration is the complexation of a metal ion such that the ion does not retain its original reactive properties. Unlike threshold inhibition, sequestration does not connote either stoichiometry or specific functionality. Some phosphonate or polymer additives commonly used for mineral scale control can sequester ions such as calcium, magnesium, and barium, preventing them from forming insoluble complexes with compounds such as carbonate and sulfate.

A chelate is a coordination compound in which a central metal ion such as $Ca^{2+}$ is attached by coordinate links to two or more non-metal atoms in the same molecule, called ligands. Thus, a chelating agent is an additive that links to a metal ion at two or more points within the agent molecule. In practice, polymers such as polycarboxylates and sulfonated copolymers act as chelating agents with most multi-valent ions due to the multiple binding sites along the polymer's backbone. In common usage, chelation further implies a more permanent or substantive relationship between the ion and the ligand and refers to stoichiometric relationships between the metal ion and the ligand.

Stabilization may refer to two distinct mechanisms. In colloidal stabilization, precipitation in a fluid (such as water) occurs, but the polymer additive prevents agglomeration of particles larger than one micron in size. These particles are thus stabilized via electrostatic interactions with the polymer and remain suspended throughout the water phase. These sub-micron particles are typically invisible to the naked eye. A notable exception to this is stabilized iron particles, which can be visible due to the orange-brown color associated with most oxidized ($Fe^{3+}$) iron complexes. Colloidal stabilization can fail due to physical or chemical changes in the fluid that result in particulate agglomeration beyond one micron in size and bulk settling of the precipitate. The alternate usage of "stabilization" is as a synonym for sequestration, where a coordination complex between a polymer additive and soluble ions, or surface interaction between polymer and forming crystal lattices, occurs, preventing precipitation.

Particulate dispersion is a suspension of particulates in an aqueous solution. Particulate dispersion involves a mixture of finely divided particles, called the internal phase (often of colloidal size), being distributed in a continuous medium, called the external phase. These can be inorganic (e.g., calcium carbonate), organic (e.g., biomass), or a mixture of the two. Polymer composition and molecular weight (Mw) are key determinants in deriving functionality for effective particulate dispersion.

The final mechanism discussed here in relation to scale control is crystal habit modification. A crystal habit is defined as the normal size and shape of a precipitated substance in a given set of environmental conditions. FIGS. 1A through 1E illustrate simplistically a formation process of crystals such as calcium carbonate, and the crystals' subsequent deposition onto surfaces. The formation of crystals such as calcium carbonate and their subsequent deposition onto surfaces follow a process, simplified here for clarity, of nucleation (illustrated in FIG. 1A), lattice formation and propagation (illustrated in FIG. 1B), bulk precipitation (illustrated in FIG. 1C), and surface deposition (illustrated in FIGS. 1D & 1E). Modification of crystal habit involves introducing a "poison" or contaminating additive that disrupts normal lattice formation. This, in turn, yields crystals tending either to re-dissolve or to precipitate in abnormal forms that deviate from the substance's untreated crystal habit. This effect tends to reduce cohesion of the crystals to each other (dispersion) and adhesion of crystals to system surfaces (scaling).

Although the general mechanisms described above are known and, to some degree, understood in the art of treating aqueous systems, the exact functionality of treatment additives often is not. In practice, various polymer additives often are viewed as single-purpose. In application, threshold inhibition is often prioritized as the most important scale control mechanism, to the relative neglect of other mechanisms. By focusing more precisely on additive functionalities, it is possible to take advantage of interrelationships among these scale control mechanisms, and improvements can be achieved in the art of treating aqueous systems.

An object of the invention is to achieve improved treatment of aqueous systems by re-prioritizing the scale treatment mechanisms targeted. A further object is to prepare a substantially poly-maleic additive through in-situ formation of maleic acid copolymer so that mono-carboxylic acids, non-ionic functional groups, and terminal hydroxyl groups are also formed during polymerization. Improved treatments may then be applied to aqueous systems to achieve various improvements in scale prevention or remediation.

BRIEF SUMMARY OF THE INVENTION

In a basic embodiment of the invention, a method is described to prioritize crystal habit modification in selecting a treatment additive for aqueous systems. In further illustrative embodiments, polymer materials are specified which exhibit improved crystal habit modification properties and other advantages. Also, methods are specified for preparing and applying improved polymer additives to prevent, reduce, or remediate scale formation or precipitation in aqueous systems.

BRIEF DESCRIPTION OF THE DRAWINGS

The invention may be better understood with reference to the following figures and detailed description.

FIG. 6 is a table of simplified polymer functionalities for some common mineral scales and deposits.

FIG. 8 is a table detailing experimental conditions.

FIG. 17 shows chemical structures and reactions related to an enhanced copolymer.

DETAILED DESCRIPTION

Known methods and additives have tended to emphasize threshold inhibition as a primary mechanism in treating aqueous systems. Illustrative embodiments of the invention prioritize effective crystal habit modification in the selection, preparation, and application of treatment additives.

Crystal growth is dynamic. Crystalloids (forming crystal lattices) that do not grow properly tend to re-dissolve. Treatment additives, as discussed above, can modify the size and shape of mineral crystal habits. Crystal habit modification is a significant basis for improved treatment of aqueous systems. In fact, crystal habit modification itself can yield improved performance in other scale control mechanisms. Crystal modification is a mechanism that facilitates the sub-stoichiometric action of threshold inhibition. Crystal modification is also an in-situ mechanism that prevents or reduces particle cohesion, resulting in reduced deposition tendency. Crystal modification additionally produces distortions in crystalline surface or lattice structure that limit surface-to-surface contact area, thus limiting potential adhesion. Further, what is recognized as stabilization and, in some cases, dispersion, can also be enabled or enhanced by the functionality of crystal habit modification. Thus, through better understanding of how polymer additives act to modify crystal habit, enhanced additive performance across several scale control mechanisms can be realized, yielding enhanced overall performance.

When designing or selecting a polymer for mineral scale control, it is important to recognize the desired primary functionalities, their impact upon scale control efficacy, and nuances that may enhance overall performance. Polymers can be particularly sensitive to a wide range of design factors, including for example composition, molecular weight, molecular weight distribution, polymer end-groups, and the manufacturing or polymerization process utilized. Each of these considerations can have substantial consequences upon overall performance, the emphasized functional feature (e.g., threshold inhibitor, dispersant, crystal modifier), the polymer's stability and retained performance in severe service conditions, and the type of mineral scale or deposit the polymer will control.

Figure 1A:
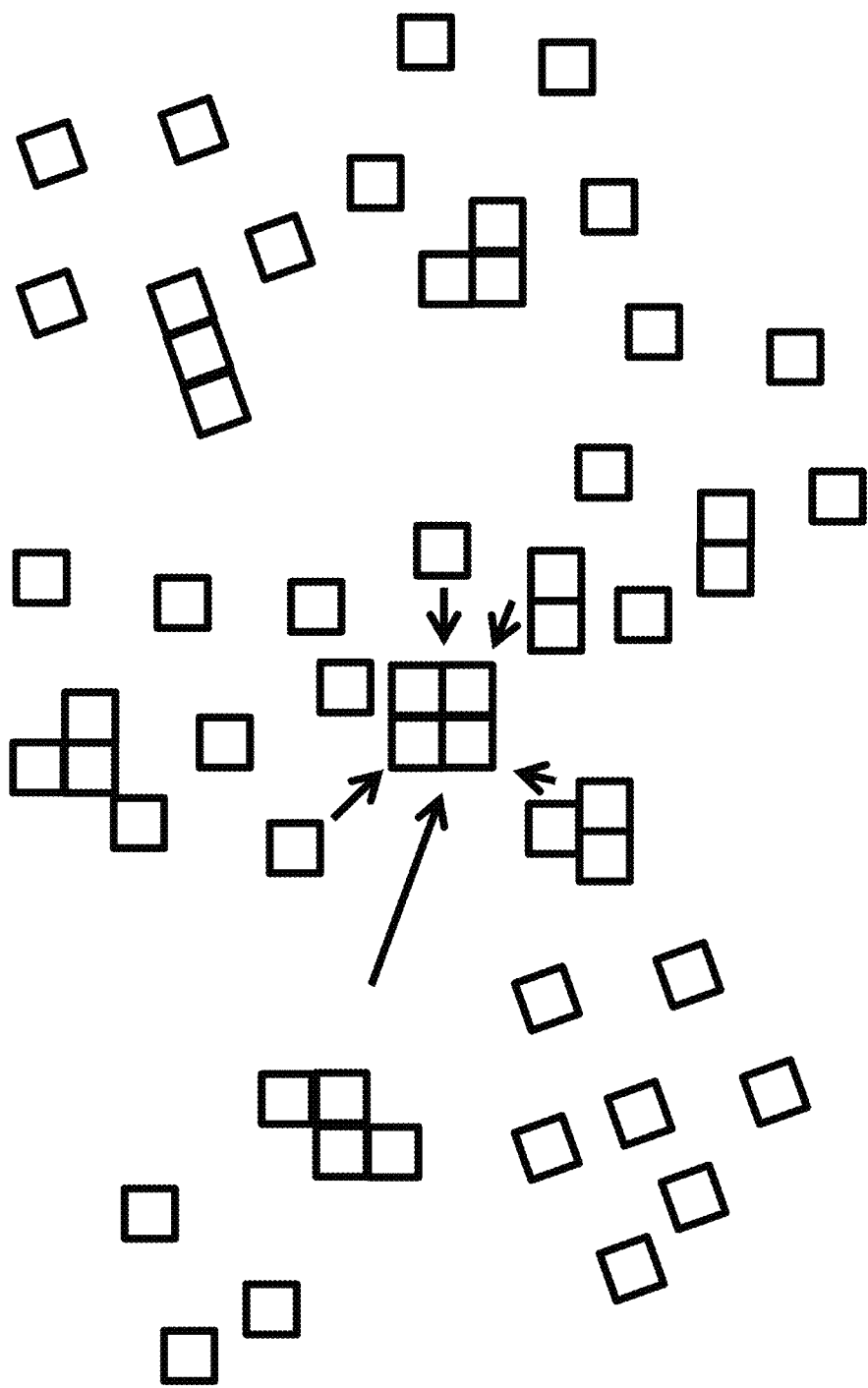
FIG. 1A depicts nucleation (diffusion from solution to solids).
Figure 1B:
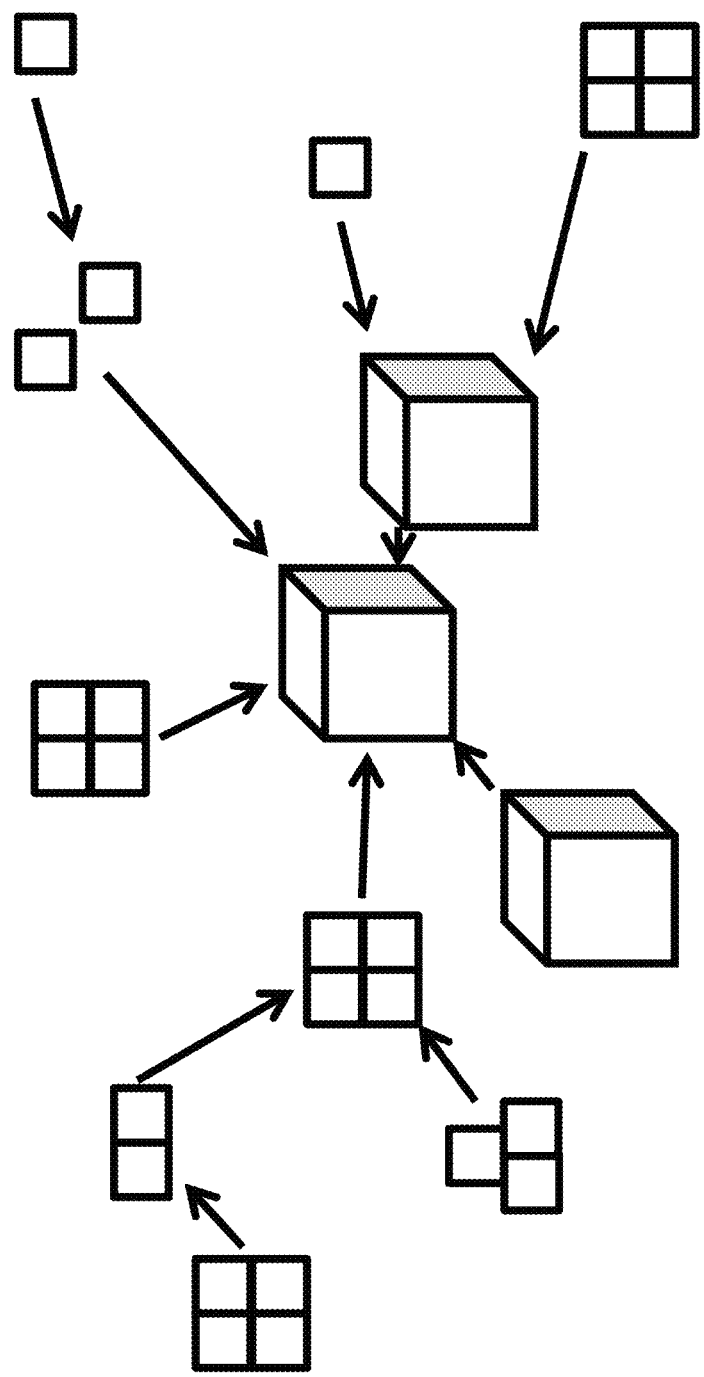
FIG. 1B illustrates lattice formation and propagation (disorder to order).
Figure 1C:
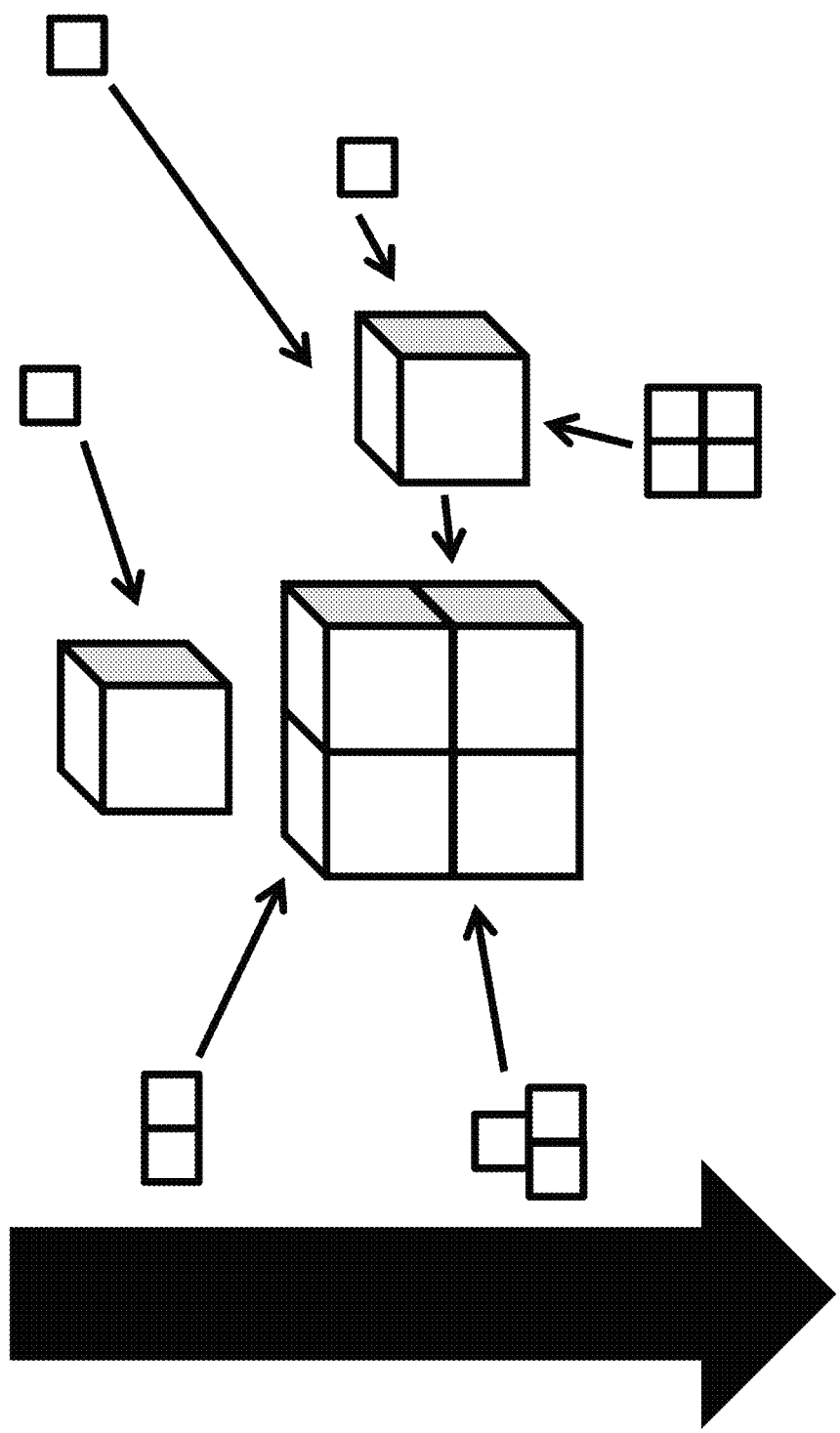
FIG. 1C depicts macro calcite formation, bulk precipitation, and exhaustion of soluble ions.
Figure 1E:
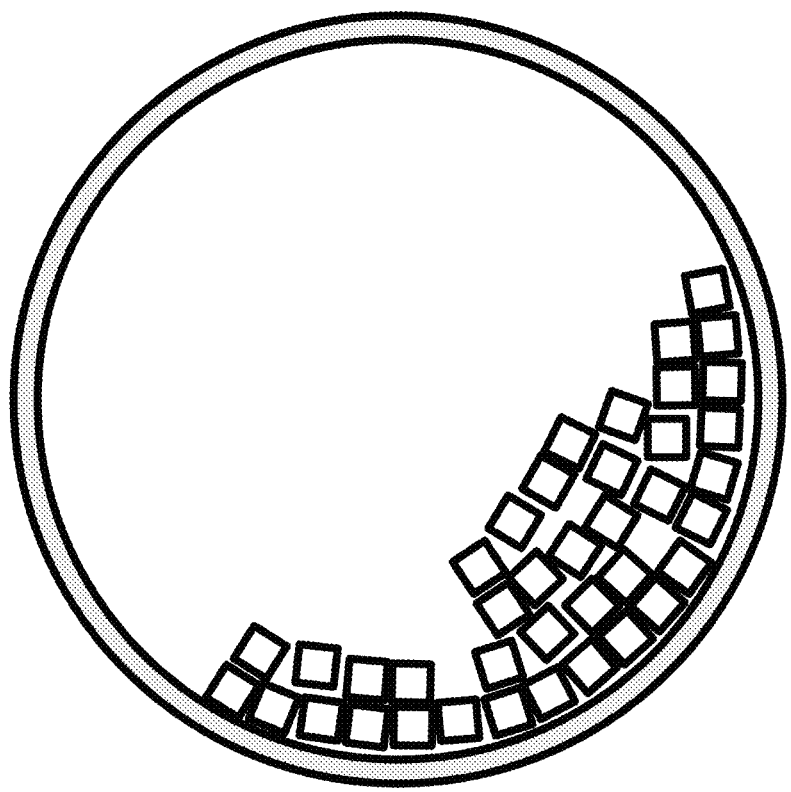
FIG. 1E illustrates surface deposition via adhesion to a tube/pipe interior.
Figure 1D:
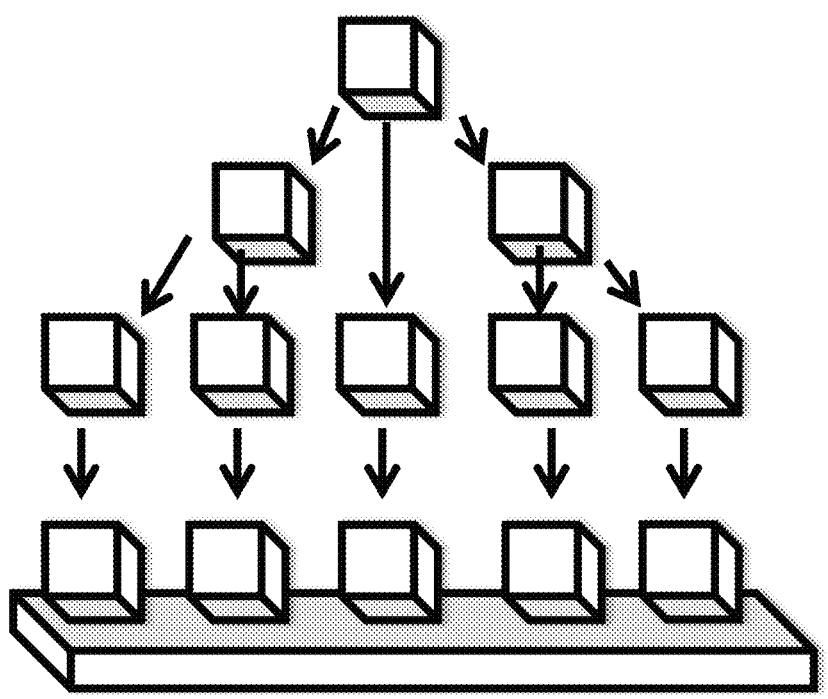
FIG. 1D illustrates surface deposition via adhesion to a metal surface.
Figure 2A:
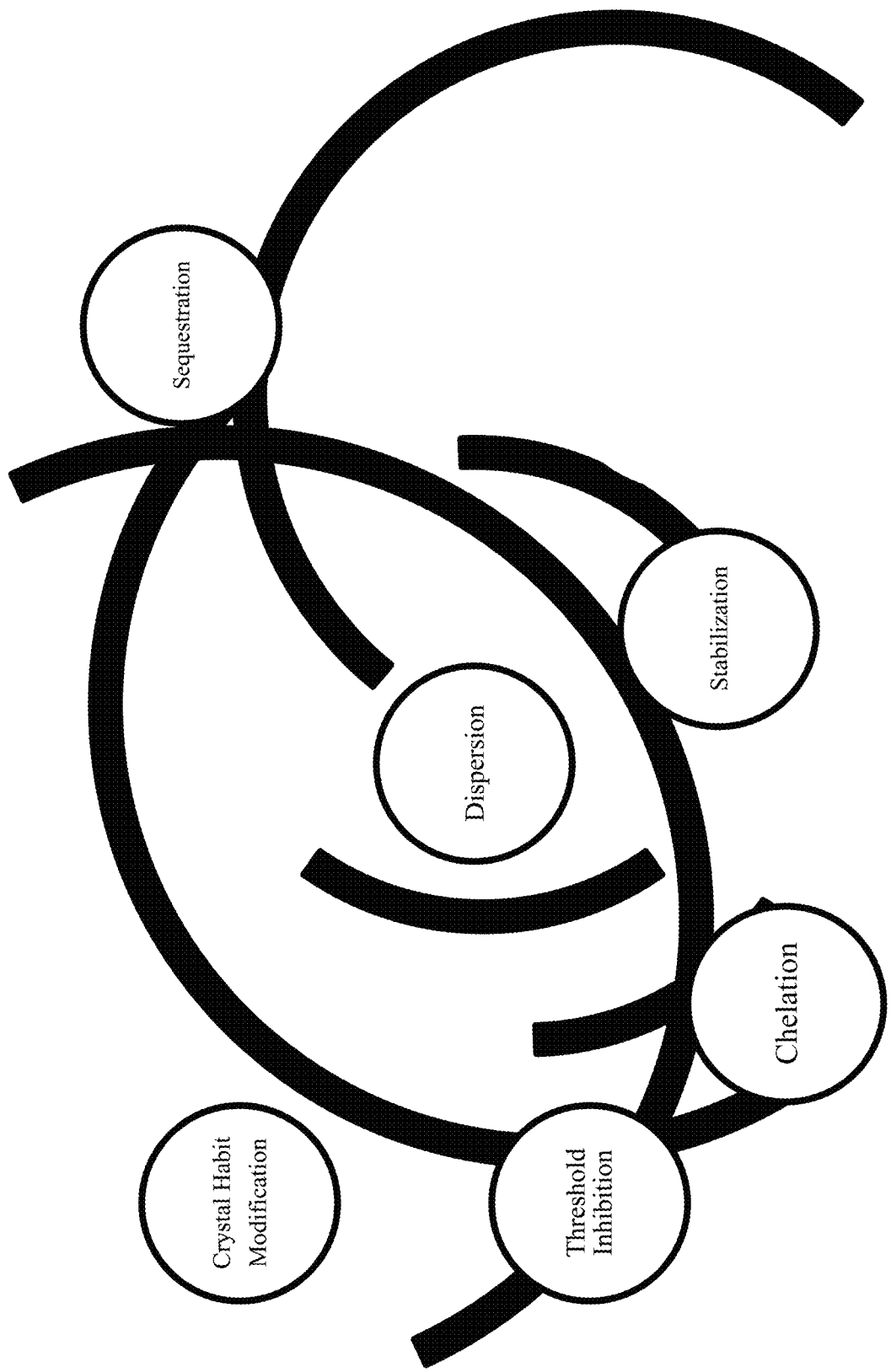
FIG. 2A illustrates a typical understanding of mechanisms of polymer functionality.
Figure 2B:
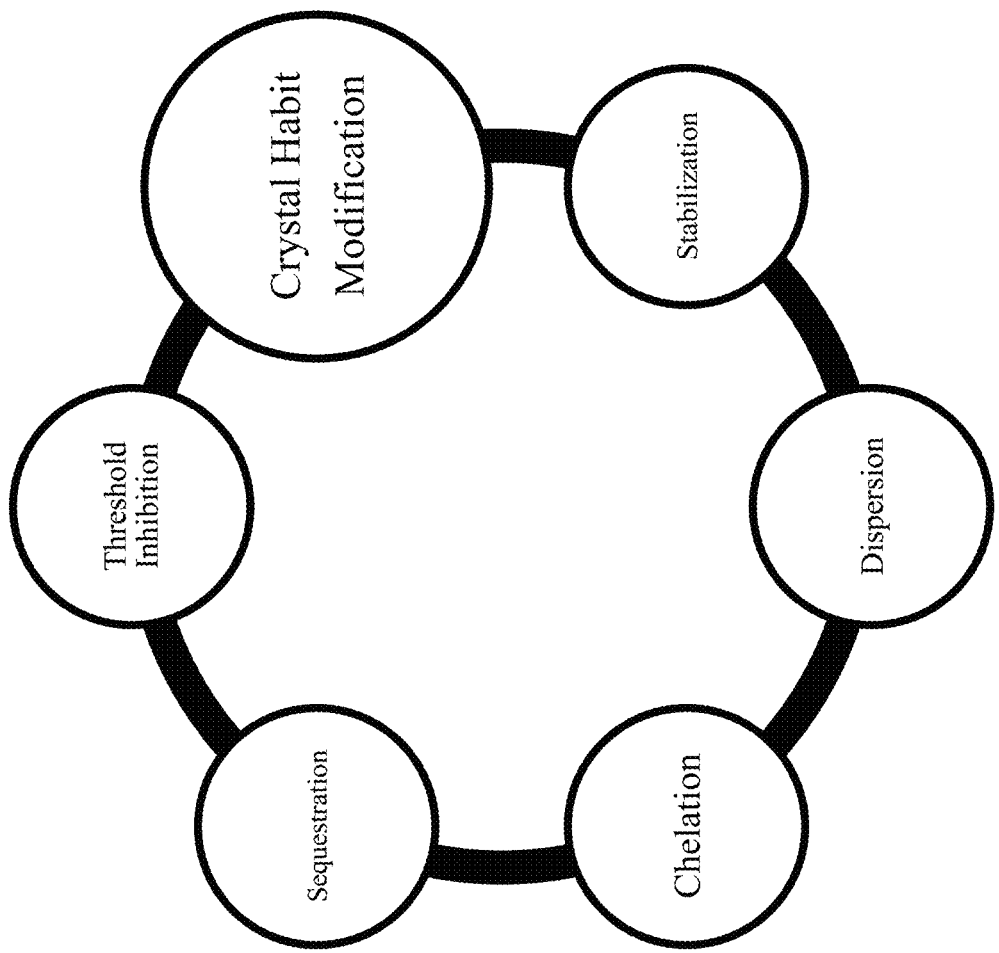
FIG. 2B depicts an improved understanding which prioritizes crystal habit modification as a first-order concern in treating aqueous systems.

In an embodiment of the invention, crystal habit modification is prioritized as a primary functionality of potential polymer additives for treating aqueous systems. FIG. 2A illustrates a typical view of polymer functionality, in which each of the six scale control mechanisms described above are viewed discretely, and one or more mechanisms may be selected as a primary treatment focus. While it may be common for some producers or sellers of treatment additives to make broad claims for a product's functionality across most or all of these mechanisms, a skeptical purchaser or user of such products often has come to view each one as a single-purpose additive. Thus the interrelationships of functional mechanisms for polymer additives may be easily overestimated or underestimated. FIG. 2B depicts a re-alignment of focus on these functional mechanisms, prioritizing crystal habit modification as a first-order concern in treating aqueous systems.

Figure 3A:
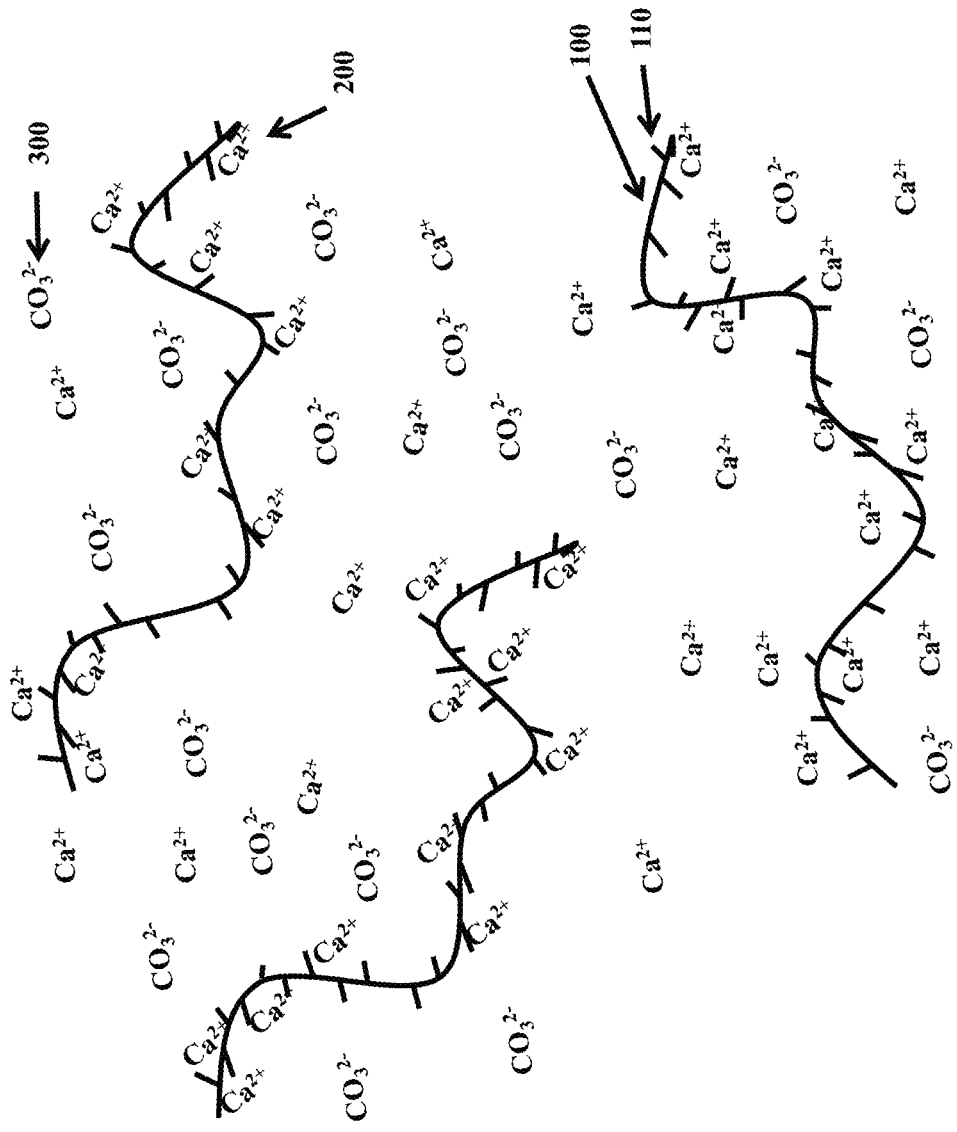
FIG. 3A conceptually depicts sequestration and chelation in polymer interactions with divalent calcium in an illustrative case.

As illustrated in FIG. 2B, the mechanisms enabling polymer additive functionalities are to a large degree interconnected. Overall scale control can be better achieved by employing multiple mechanisms sequentially or simultaneously. To illustrate this, using for example a carboxylated homopolymer such as polymaleic acid to control calcium carbonate scaling, all six scale control functionalities are likely relevant to the scale management process. Sequestration could be an initial interaction employed between the polymaleic acid and calcium carbonate. As illustrated in FIG. 3A, in the sequestration line of defense, the polymer 100 is sequestering calcium ions 200 such that the calcium ions 200 are unavailable for combination with carbonate ions 300. By definition, chelation is also employed here. The carboxylic acid (H—O—C=O or COOH) functional groups 110 along the backbone of polymer 100 carry a minus one charge. Because of this, two carboxylic acid groups 110 are required to fully sequester each divalent (2+) calcium ion 200. It is this coordination of the polymer 100 at two sites along the molecule with the calcium ion (central metal ion) 200 that meets the formal definition of chelation.

The functionality of sequestration and chelation by such polymers is typically temporary in process water treatment applications such as cooling towers and boilers. The duration (how long?) and extent (how much?) the polymer can maintain solubility of calcium in an environment where carbonate species is present is dependent upon many factors, including the concentration of the scale forming ions (in this case $[Ca^{2+}][CO_3^{2-}]$), pH, temperature, polymer concentration, polymer efficacy (design), presence and concentration of suspended solids, presence and concentration of other soluble ions, the rate in which the water (and its impurities) are concentrated, and the frequency of polymer addition.

Figure 3B:
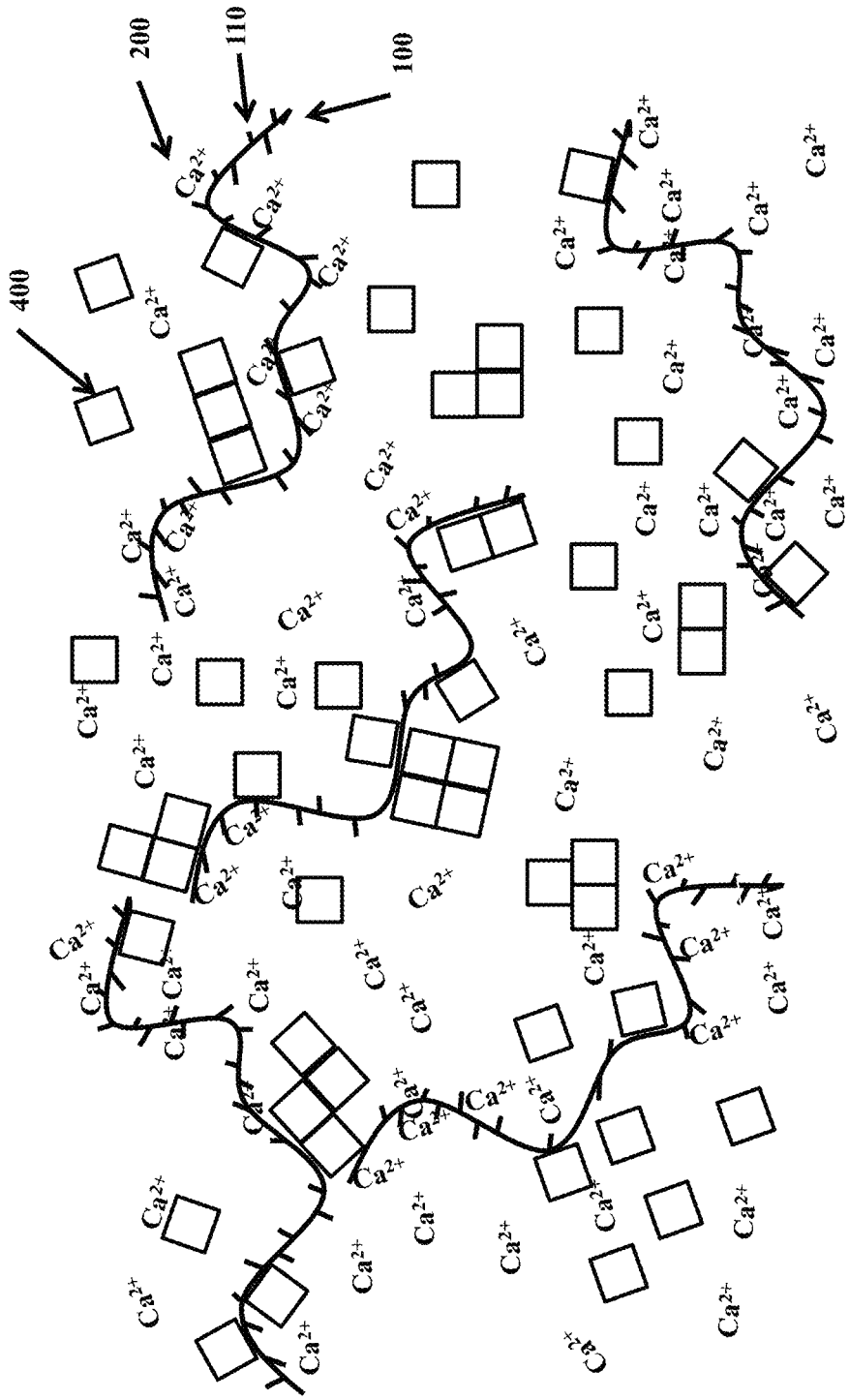
FIG. 3B conceptually depicts sequestration, chelation, crystalloid formation, and stabilization.

FIG. 3B illustrates that as calcium carbonate 400 begins to precipitate in this example, it is necessary for the polymer 100 to interact with both the soluble calcium 200 that remains in solution (sequestration, chelation) and also the forming crystal lattices 400, which are sometimes referred to as crystalloids. These calcium carbonate crystalloids 400 can be thought of as "pre-crystals" as they have begun to form crystal lattices that are necessary for formation of macro, insoluble calcium carbonate scale. However, these crystalloids 400 are considered soluble or, at least, at the verge of precipitation and highly vulnerable to re-solubilization. In this case, the polymer 100 can begin to exhibit stabilization functionality. The polymer 100 may not be able to fully sequester all the calcium ions 200 that are present, nor may it be able to prevent formation or repeated dissolution (partial threshold inhibition mechanism) of crystalloids 400, but it may be effective in preventing growth of the crystalloids beyond the size of colloidal particles.

A key determinant in the functionality of threshold inhibition is a sub-stoichiometric relationship between the level of polymer and the scale forming species. A strict mechanism of sequestration and/or chelation would not allow for this relationship. Rather, a process of partial and/or temporary sequestration, formation of the crystalloid, and re-dissolution of the interrupted crystal lattice formation is necessary to accomplish this phenomenon at sub-stoichiometric ratios. With reference again to FIG. 3B, through the process it can be envisioned that the polymer 100 is fighting a battle on two fronts: the water soluble battle with divalent calcium 200 and the water insoluble battle against calcium carbonate crystalloids 400. As it has been defined, threshold inhibition is a temporary effect. Thus, the polymer 100 can be understood to be winning and losing each of these battles simultaneously until bulk precipitation occurs. The polymer 100 essentially wins as it sequesters divalent calcium ions 200 (water soluble battle) and as it adsorbs onto crystalloid surfaces 400 (water insoluble battle) disrupting crystal lattice formation. The effective concentration of polymer 100 is constantly being depleted as the polymer wages war on both fronts. However, as crystalloids 400 re-dissolve, the polymer 100 too is freed to continue the battle on the water soluble front with calcium ions 200. This process is continued up to the point at which crystalloids 400 tend to form lattices 500 that do not re-dissolve, where larger macro-structures of calcium carbonate form, and bulk precipitation occurs. Again, the rate and duration of this polymer-calcium carbonate war is dependent upon a variety of factors, including several previously mentioned. Threshold inhibition is an unusual event that is somewhat specific to certain polymers and phosphonates. Other materials that can have much stronger sequestering or chelating properties or a much higher affinity for adsorption onto forming calcium carbonate do not exhibit threshold inhibition properties.

Once bulk precipitation has occurred, the two remaining mechanisms for mineral scale control may be employed. Dispersion is perhaps the simpler of the two, although nuances exist here. It is important to separate the concept into two pieces: in-situ dispersion and post-precipitation dispersion. In both cases, the polymer is effective in maintaining a suspension (dispersion) in solution by electrostatic repulsion. In each case, the polymer interacts both with the precipitate and with other polymer molecules to prevent agglomeration and resultant separation from solution. However, in some cases, where the polymer is present in-situ, another benefit can be employed. If the polymer is effective in modifying or distorting crystals as precipitation occurs, those crystals are much less likely to cohere to other crystals and thus are much more easily dispersed. Polymaleic acid is a known example of this in-situ mechanism. Polymaleic acid is actually rather poor at suspending solids due to its very low molecular weight (typically 500-800 Daltons). In contrast, polymaleic acid is rather effective at preventing agglomeration of solids such as calcium carbonate when it is present as a crystal habit modifier during the precipitation process.

The ability of a polymer to modify the crystal habit of mineral scales is known in the art. Folklore suggests that prior to the invention of synthetic polymers for this purpose, starch (a naturally occurring polymer) from potatoes was utilized to soften scale in the boilers of steam locomotive engines. More recently, synthetic polymers such as polycarboxylates (polyacrylic acids, polymaleic acids), sulfonated copolymers, and various other polymers have been used specifically for this purpose in a variety of water treatment applications. The concept of crystal habit modification is simple and qualitative. Essentially, the expectation for the polymer is to adsorb onto the surface of a forming crystal lattice, impede the directional growth of the lattice, and subsequently promote the formation of precipitated crystals that are abnormal in shape, size, and overall appearance.

Figure 4A:
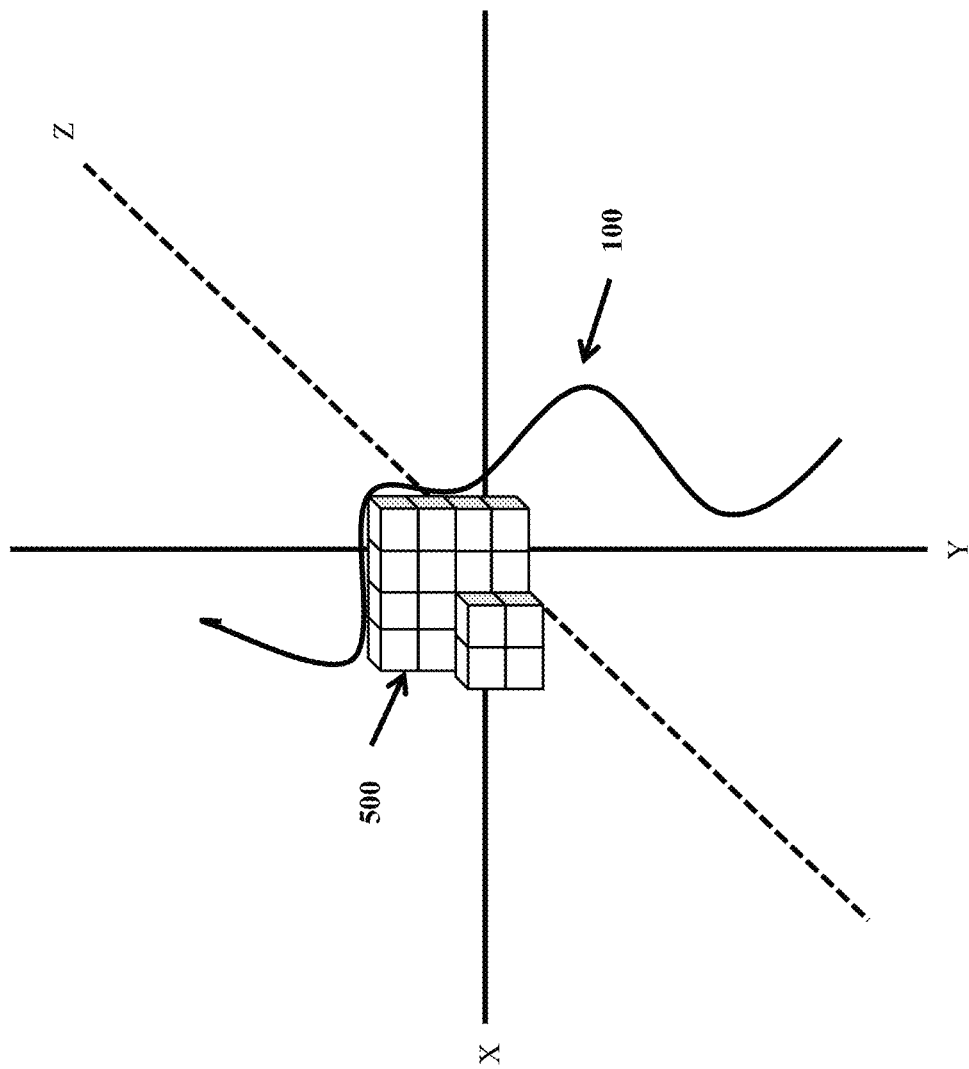
FIG. 4A is a conceptual depiction of polymer adsorption onto a forming crystal lattice.
Figure 4B:
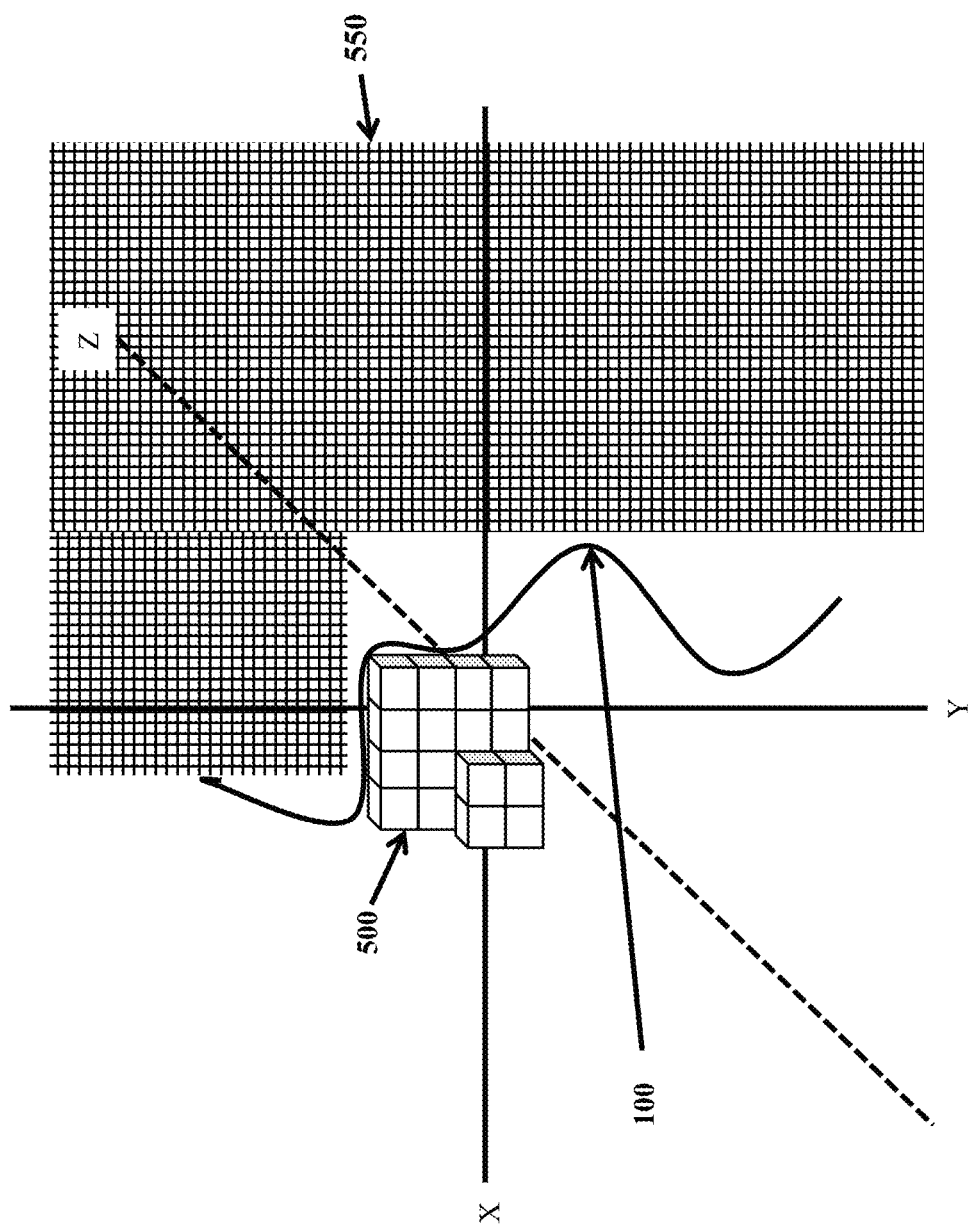
FIG. 4B further illustrates dimensions of inhibited crystal growth.
Figure 4C:
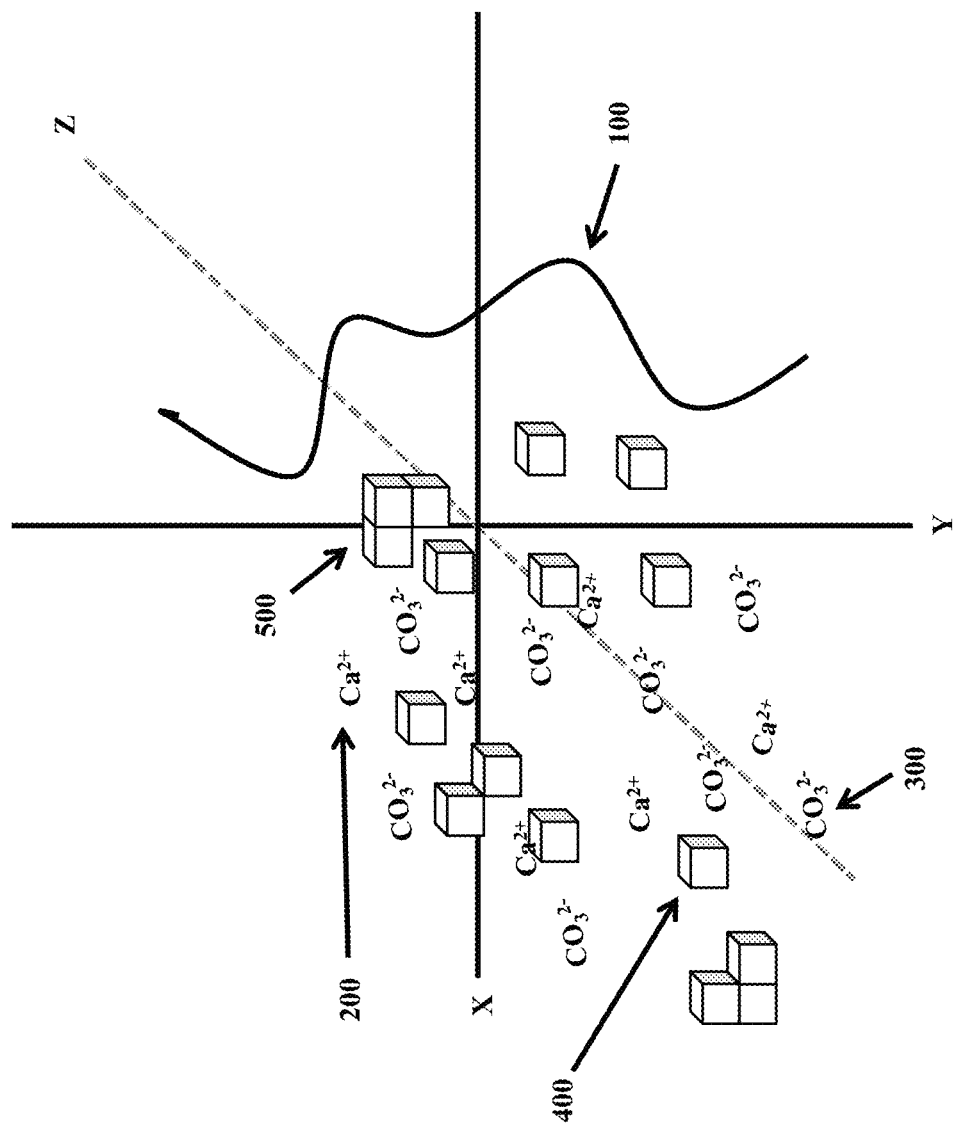
FIG. 4C depicts re-dissolution of an unstable crystal lattice.
Figure 4D:
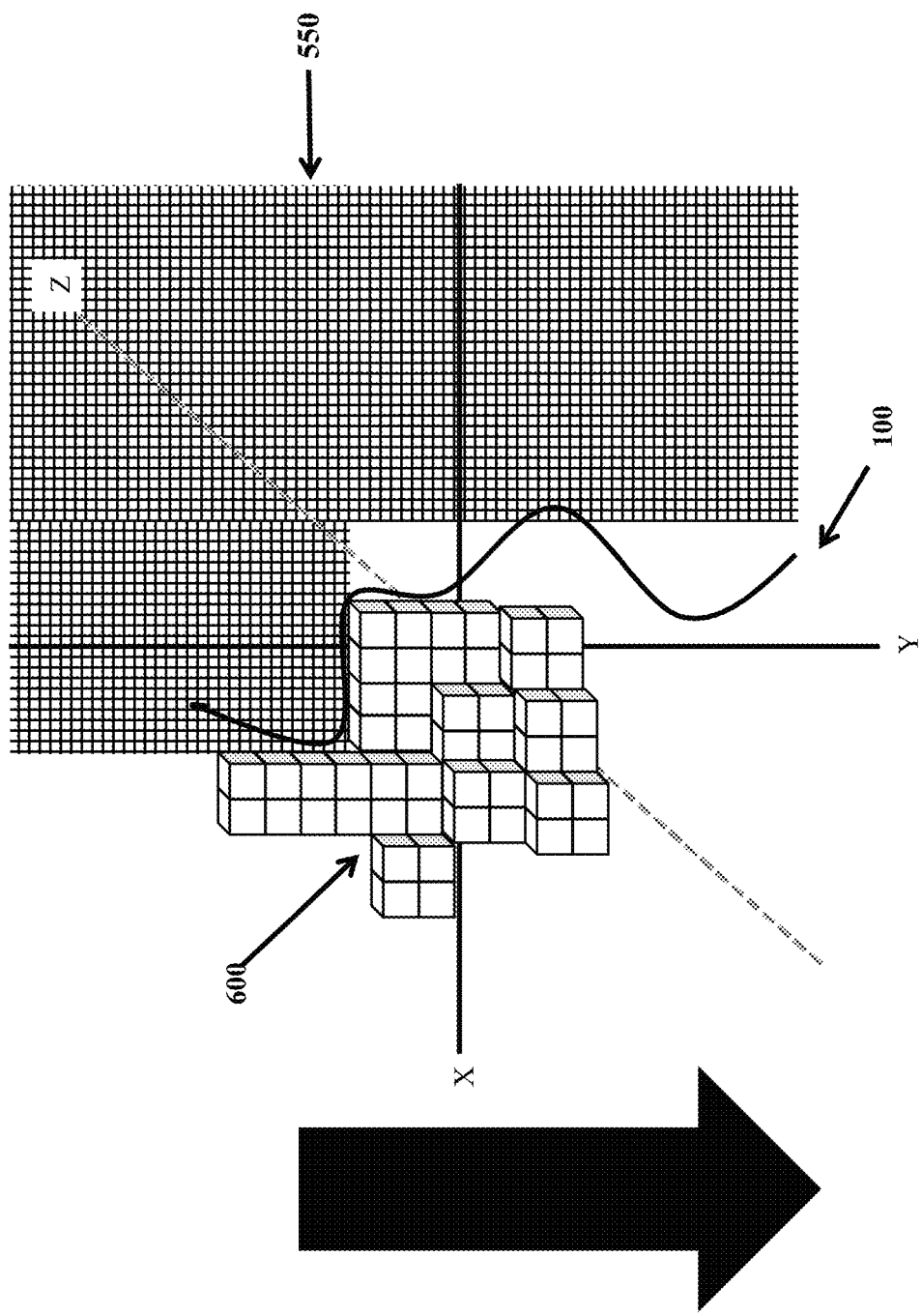
FIG. 4D shows bulk precipitation with crystal habit modification of the bulk precipitate.
Figures 5A, 5B:
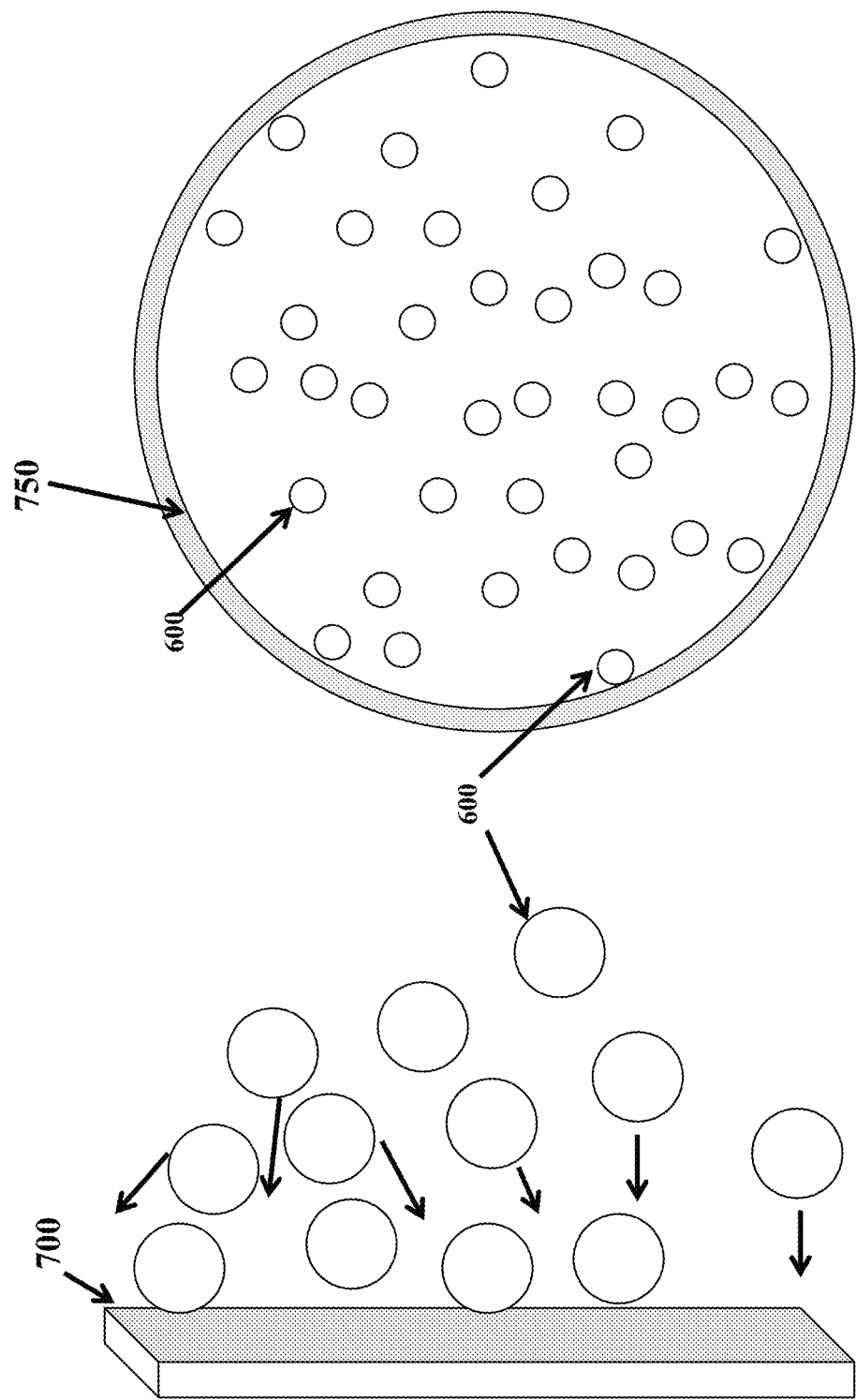
FIG. 5A illustrates crystal habit modification in bulk precipitates relative to surfaces in a system.
FIG. 5B illustrates crystal habit modification in bulk precipitates relative to surfaces in a system.

This can be illustrated in FIGS. 4A-4D. FIG. 4A shows a three-dimensional illustration of a forming crystal lattice 500 where a polymer 100 begins to adsorb onto the lattice surface. It can be observed in FIG. 4B how this adsorption of the polymer 100 inhibits directional growth of the forming crystal lattice 500 in several dimensions or directions 550. The directional growth inhibition then leads to one of two events with the forming crystal lattice 500. The lattice 500 is either unstable, such that it tends to re-dissolve (FIG. 4C) as crystalloids 400, or bulk precipitation occurs and crystal habit modification of the bulk precipitate 600 is observed (FIG. 4D). FIGS. 5A-5B illustrate the benefit of crystal habit modification in the bulk precipitate 600, which now exhibits fewer planar crystal surfaces with lower overall planar surface area. The effect is improved scale management performance, even as precipitate 600 potentially interacts with, e.g., a metal surface 700 or a tube or pipe interior 750.

When designing a polymer for mineral scale control, it is important to recognize the desired primary functionalities, their impact upon efficacy, and nuances that might enhance overall performance. Polymers can be particularly sensitive to a wide range of design factors. Among these are considerations such as composition, molecular weight, molecular weight distribution, polymer end groups, and the manufacturing or polymerization process utilized. Each of these considerations can have substantial consequences upon overall performance, the emphasized functional feature (threshold inhibitor, dispersant, crystal modifier, etc.), the polymer's stability or retained performance in severe service conditions, and the type of mineral scale or deposit the polymer will control. Some insights as to how composition relates to functionality are provided in the table FIG. 6, where it can be observed that a carboxylate group, such as from acrylic acid and maleic acid, can provide the basis of functionality for calcium carbonate and calcium sulfate. Further, sulfonate groups can provide functionality for calcium phosphate, iron, and zinc stabilization. Non-ionic groups are typically utilized to enhance polymer performance by increasing interaction with a particular surface. Examples of this include the addition of a non-ionic to enhance calcium carbonate crystal modification properties, improve calcium phosphate and iron stabilization, or to add a viable interface to organics or biomass. The implications of molecular weight can be oversimplified to generalize that lower molecular weight (<3,000 Daltons) polymers tend to provide better threshold inhibition properties, while polymers with an average molecular weight between 5,000 and 10,000 Daltons tend to function better as stabilizers and particulate dispersants. Of course there are exceptions to these rules of thumb but they largely hold true throughout the range of polymers commonly offered to industry. Other aspects such as the polymerization process, end-group selection, and molecular weight distribution can have a tremendous impact upon polymer performance as well. One good example of this is the use of hypophosphite in the preparation of polyacrylates. These polymers are known as phosphinocarboxylates but, more accurately, they are polyacrylates prepared using sodium hypophosphite. These polymers are known to have better thermal stability and tolerance to iron and salts than typical polyacrylates prepared by more conventional methods.

Thus, an embodiment of the invention prioritizes effective crystal habit modification in the selection, preparation, and application of treatment additives. Focusing on effective crystal habit modification yields corollary benefits in other mechanisms of functionality, and can provide better overall scale management performance than prioritizing threshold inhibition or other mechanisms.

In further embodiments, improved copolymer additives are specified to achieve improved crystal habit modification performance, and corollary benefits.

The use of polymaleic acid (PMA) for calcium carbonate scale control has been known for many years, since approximately the 1920's. German, British, and American scientists seemingly recognized the potential efficacy and commercial benefits of PMA in similar time periods. Widespread industrial use of PMA began in the 1970's and continues in the present. PMA is known, accepted, and utilized for the treatment of water and, in particular, the control of calcium carbonate. Further, PMA has become a leading choice for service companies seeking an effective additive for severe service applications in cooling waters, boilers, oilfield operations, large-scale thermal desalination activities, and various other uses.

Figure 7B:
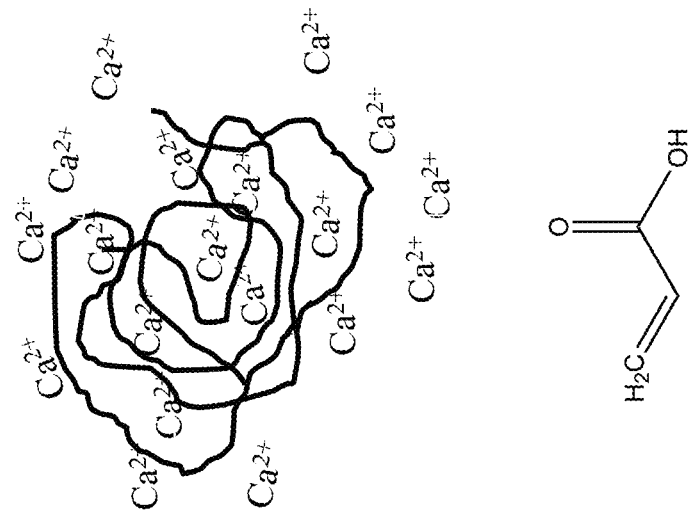
FIG. 7B illustrates polymer rigidity under stressed water conditions for mono-carboxylic acid polymers such as polyacrylic acid.
Figure 7A:
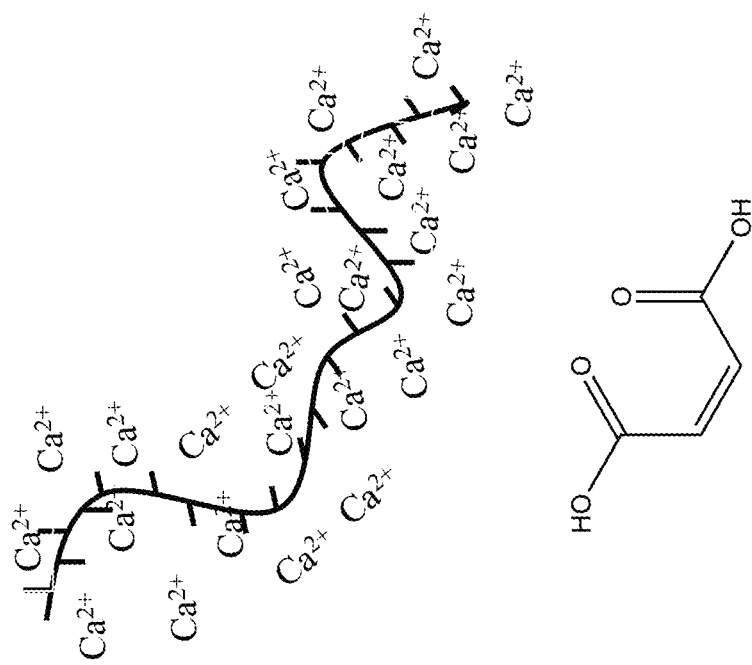
FIG. 7A illustrates polymer rigidity under stressed water conditions for an enhanced copolymer according to an embodiment of the invention.

In an embodiment of the invention, improved copolymers with certain similarities to PMA exhibit improved performance in several aspects, as compared to PMA and also to mono-carboxylic acid polymers such as polyacrylic acid. For example, improved copolymers according to the invention can exhibit improved stability in harsh water conditions, improved crystal habit modification performance for calcite (a cubic form of calcium carbonate), and highly effective calcium carbonate threshold inhibition in harsh waters. In contrast to mono-carboxylic polymers such as polyacrylic acid, the stability of such improved copolymers in harsh water systems is enhanced due to the presence and proximity of di-carboxylic acid groups along the copolymer backbone. The negative charge inherent within each carboxylic acid functional group provides effective repulsion along the backbone of the copolymer. This electrostatic repulsion, in turn, provides rigidity and stability along the copolymer that reduces the incidence of it coiling or collapsing upon itself as it encounters high levels of hardness or salinity in an aqueous environment. This comparison is illustrated in FIGS. 7A-7B. The continued extension of the copolymer conformation in harsh water environments (FIG. 7A) provides that the copolymer not only remains stable (soluble) in such conditions, but also retains its functional properties. This is in contrast to polymers such as polyacrylic acid (in FIG. 7B), which can lose both solution stability and efficacy in comparable environments.

Modification of calcium carbonate crystals is of increasing importance in modern water treatment applications. Beyond providing an underlying mechanism that enables threshold inhibition, as described above, crystal modification itself can be a primary functionality controlling mineral scale deposition in failure situations. Industry initiatives such as water conservation, use and reuse of poorer quality make-up water, and elimination of phosphorous tend to increase the likelihood of bulk precipitation and the ultimate formation of deposited mineral scale. Enhanced copolymers according to the invention can exhibit markedly improved crystal modification properties for calcite, compared to known industry products such as PMA and Multifunctional One Polymers (MOP).

Figure 9A:
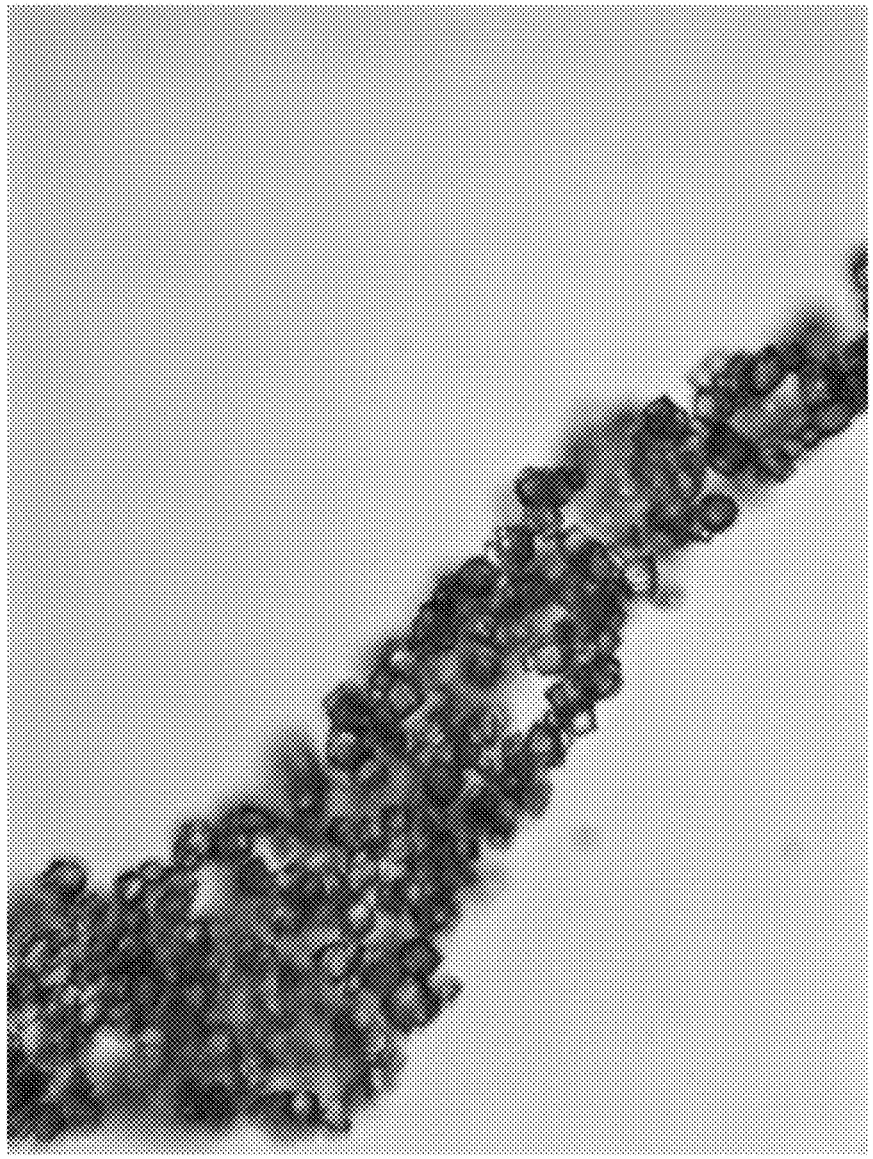
FIG. 9A illustrates compound microscopy showing exclusive formation of calcite in a blank sample without polymer treatment at 10× magnification.
Figure 9B:
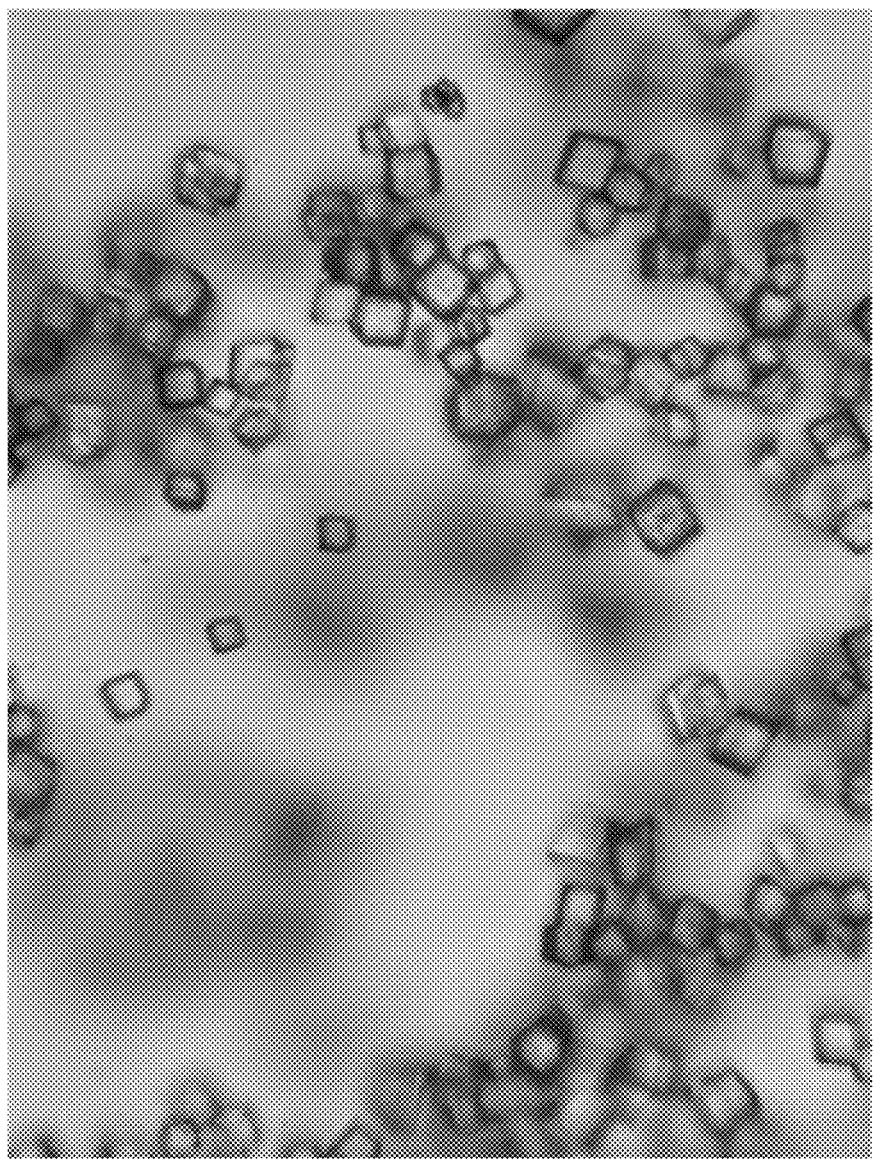
FIG. 9B illustrates compound microscopy showing exclusive formation of calcite in a blank sample without polymer treatment at 40X.
Figure 10A:
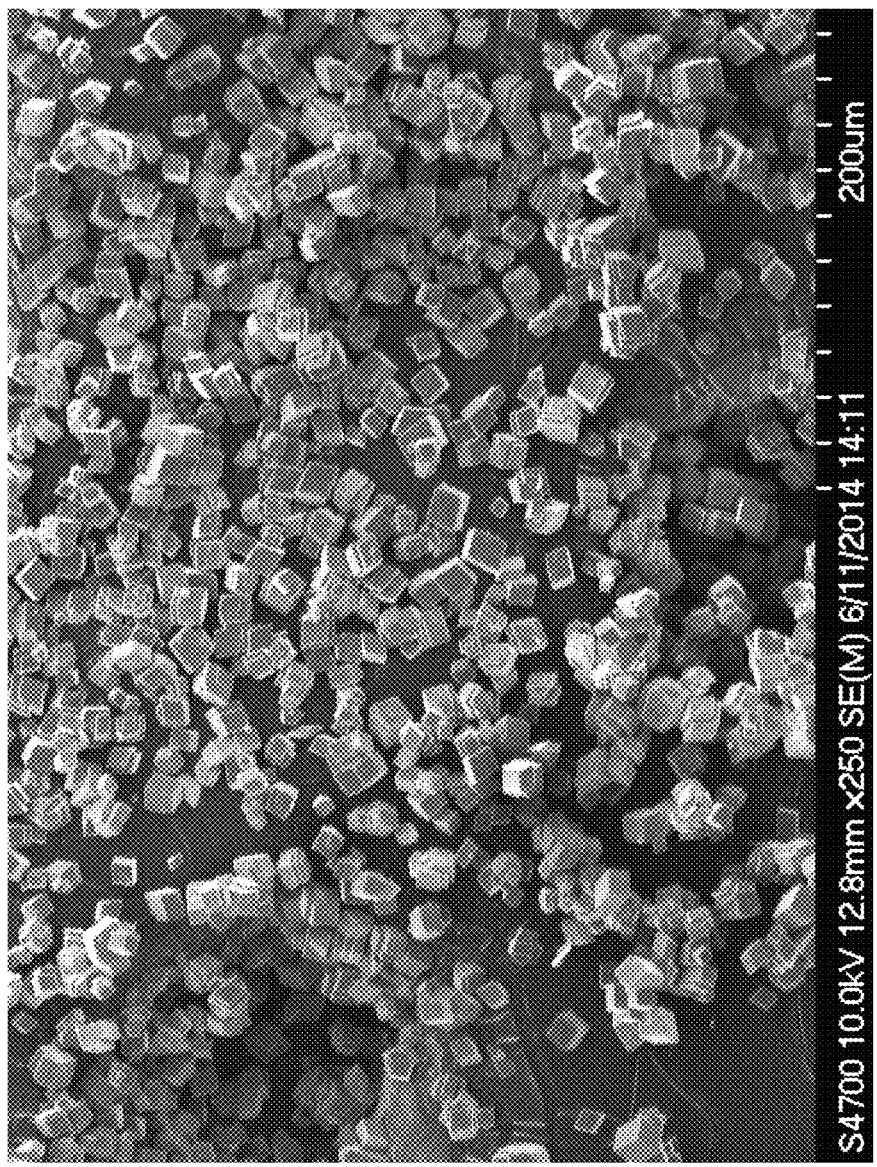
FIG. 10A illustrates a Scanning Electron Micrograph (SEM) showing a uniform calcite (cubic calcium carbonate) precipitate at 250× magnification.
Figure 10B:
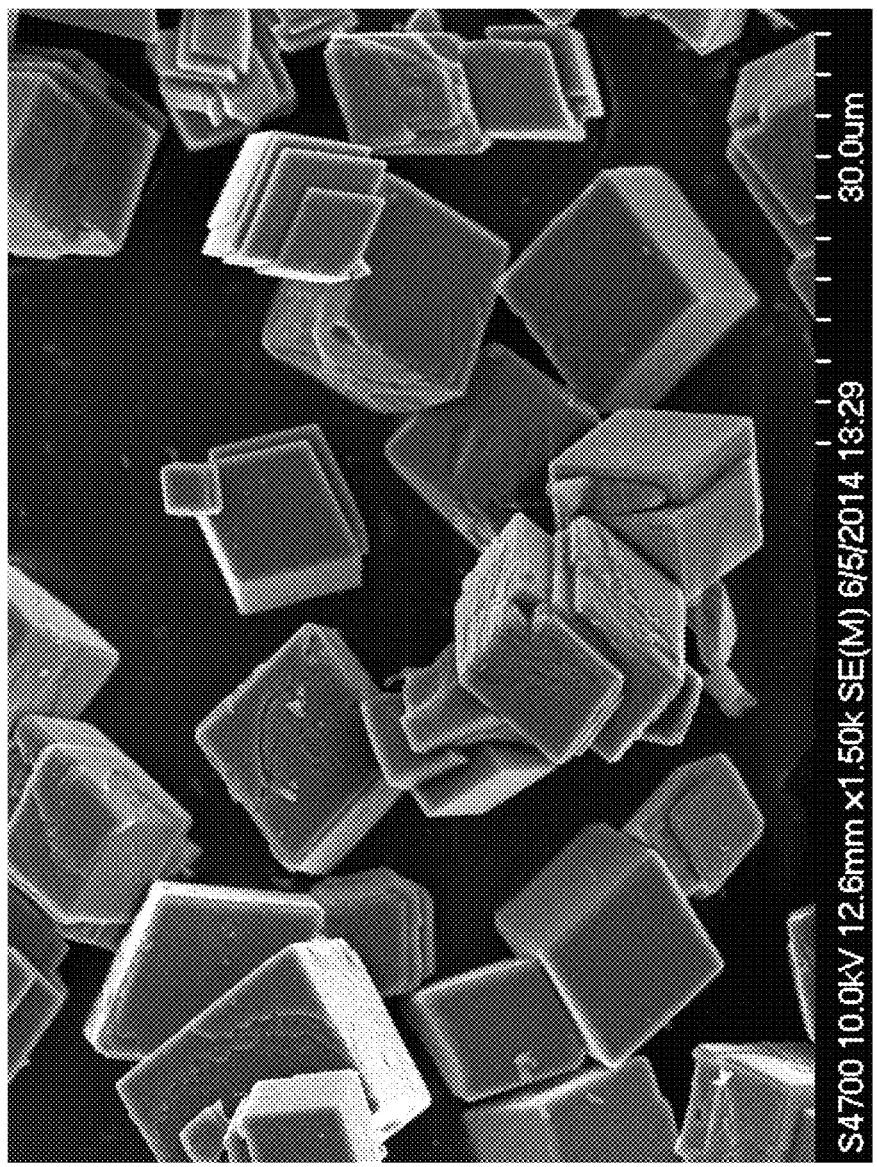
FIG. 10B illustrates a Scanning Electron Micrograph (SEM) showing a uniform calcite (cubic calcium carbonate) precipitate at 1500X.

Experimental observation and testing can demonstrate the effects of polymers as crystal habit modifiers. For example, experimental observations to evaluate relative crystal modification properties of PMA, MOP polymers, and enhanced copolymers according to the invention show improvements achieved at 15 mg/l and 30 mg/l treatment dosages relative to a blank sample with no polymer treatment. Since PMA, MOP, and enhanced copolymers each can be effective threshold inhibitors in severe conditions, laboratory work was performed under conditions that would ensure precipitation occurred, and crystal modification properties could be observed. 50 ml of a solution containing 1200 mg/l of $Ca^{2+}$ (using $CaCl_2$,.$2H_2O$) was treated with the designated polymer dosage. Using $Na_2CO_3.H_2O$, 50 ml of a 1200 mg/l solution of $CO_3^{2-}$ was then added to the $Ca^{2+}$, polymer-dosed solution. Additional solutions contained 600 mg/l of $Ca^{2+}$ and 600 mg/l of $CO_3^{2-}$. Each solution was measured to have a pH of 9.5 to 10.2 and was heated in a water bath at 70° C. for 18 hours. The samples were allowed to cool and the precipitate was collected using a plastic transfer pipette, and samples were examined by both compound and Scanning Electron Microscopy (SEM) using a Hitachi S-4700 Type II cold field emission SEM. The table depicted in FIG. 8 details the severe service conditions of the experiments. The exclusive formation of calcite is represented in FIGS. 9A-9B for the blank (no polymer treatment). Similarly, the SEM micrographs represented in FIGS. 10A-10B reveal that experimental conditions produced a uniform calcite (cubic calcium carbonate) precipitate.

Figure 11A:
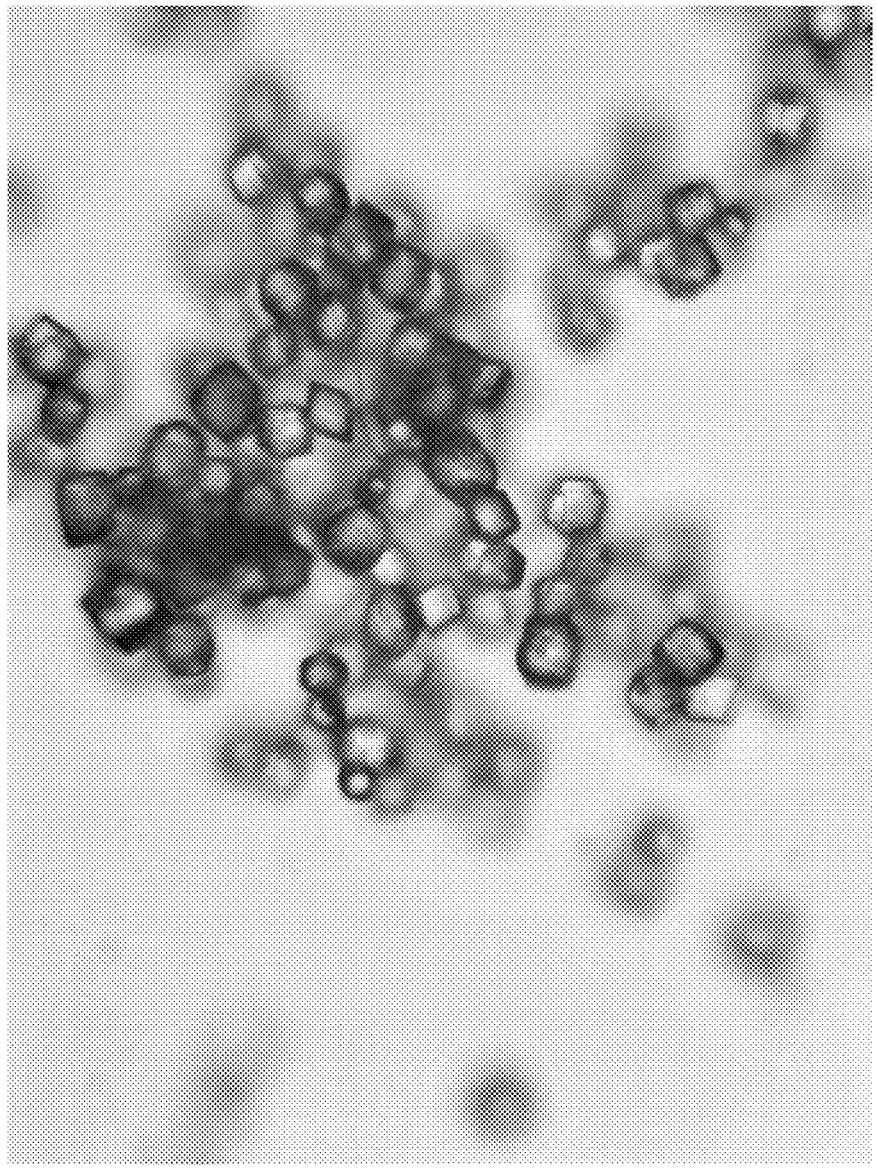
FIG. 11A illustrates compound microscopy of results of PMA treatment at 15 mg/l at 40× magnification.
Figure 11B:
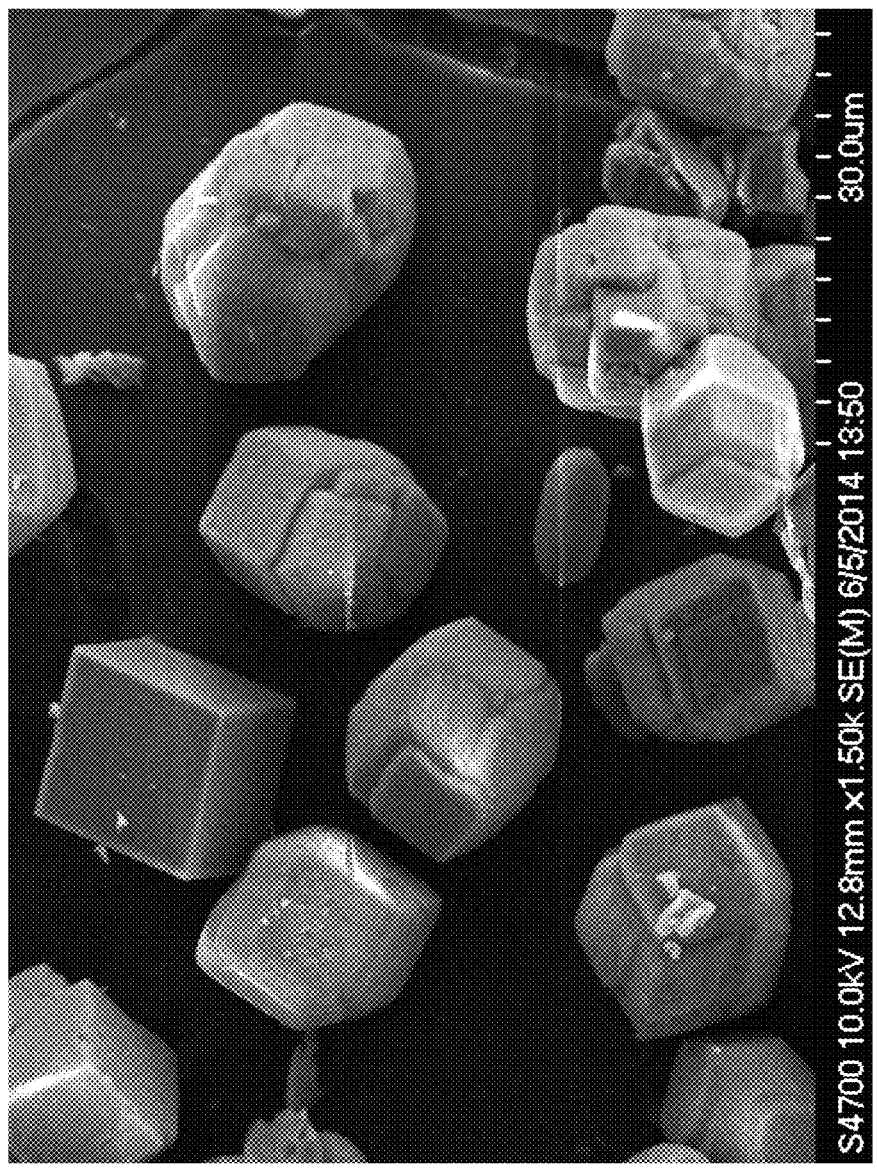
FIG. 11B illustrates SEM micrograph results of PMA treatment at 15 mg/l at 1500× magnification.
Figure 11C:
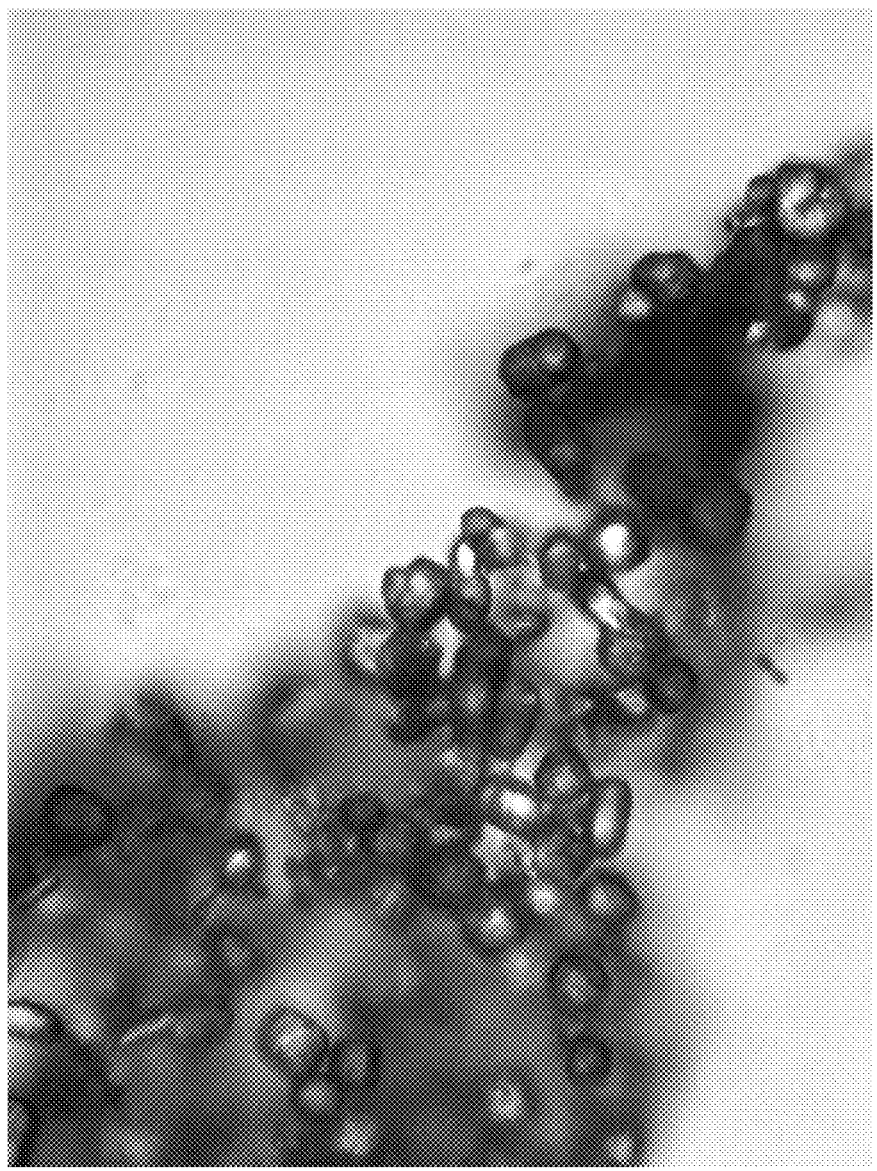
FIG. 11C illustrates compound microscopy results of PMA treatment at 30 mg/l at 40× magnification.
Figure 11D:
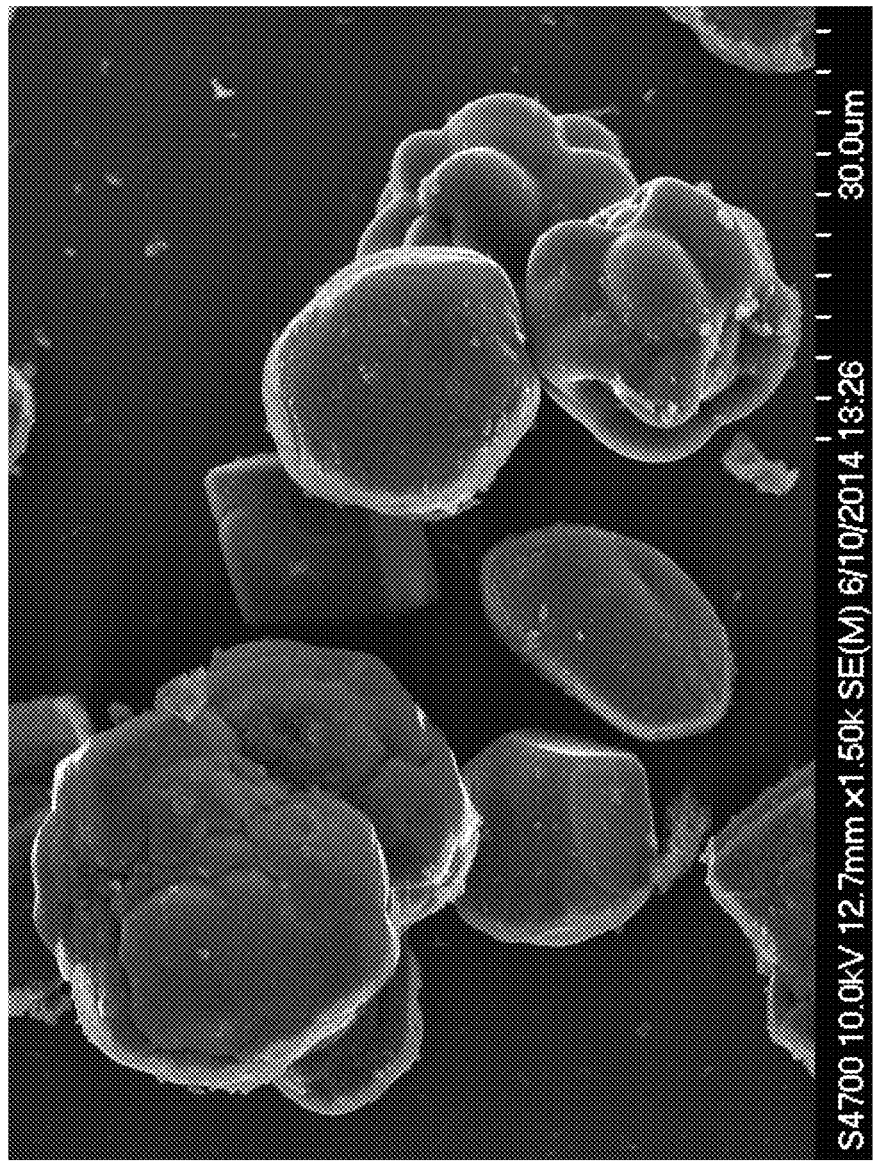
FIG. 11D illustrates SEM micrograph results of PMA treatment at 30 mg/l at 1500× magnification.
Figure 12A:
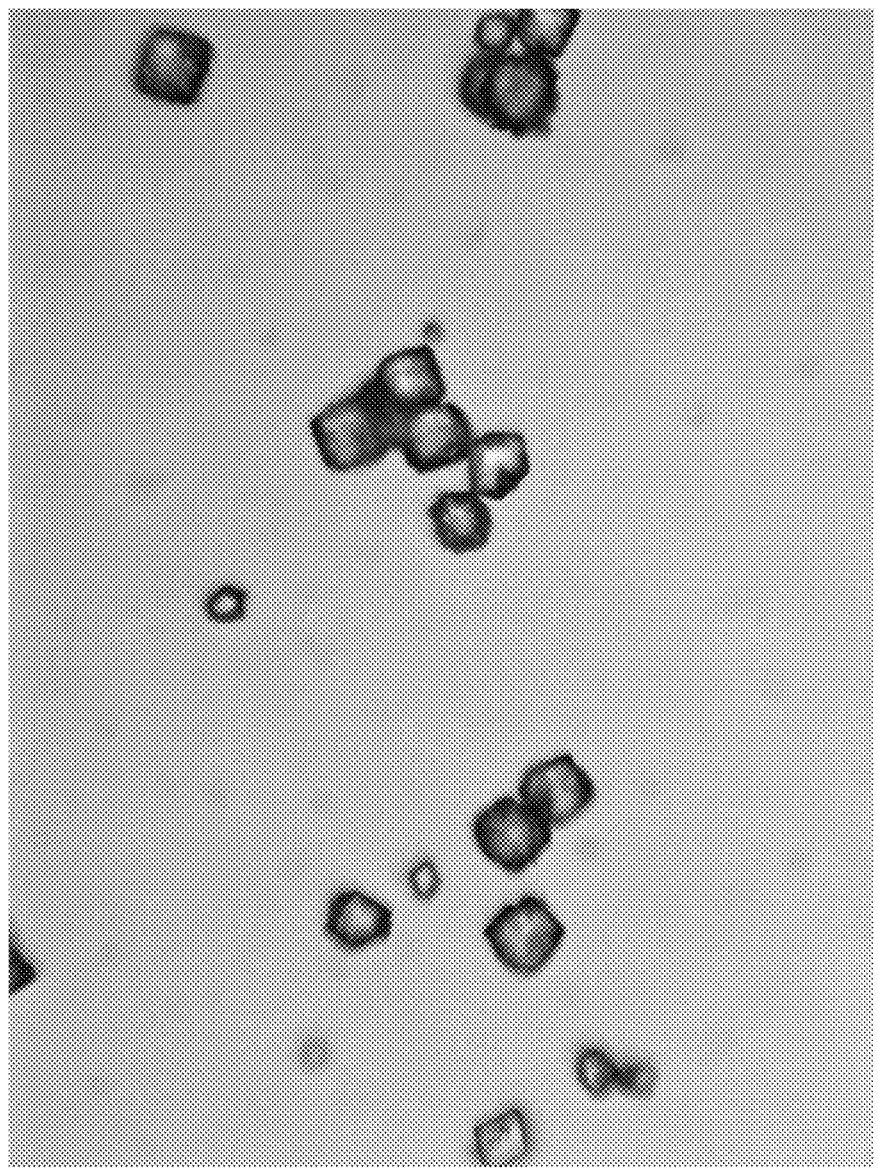
FIG. 12A illustrates compound microscopy results of MOP treatment at 15 mg/l at 40× magnification.
Figure 12B:
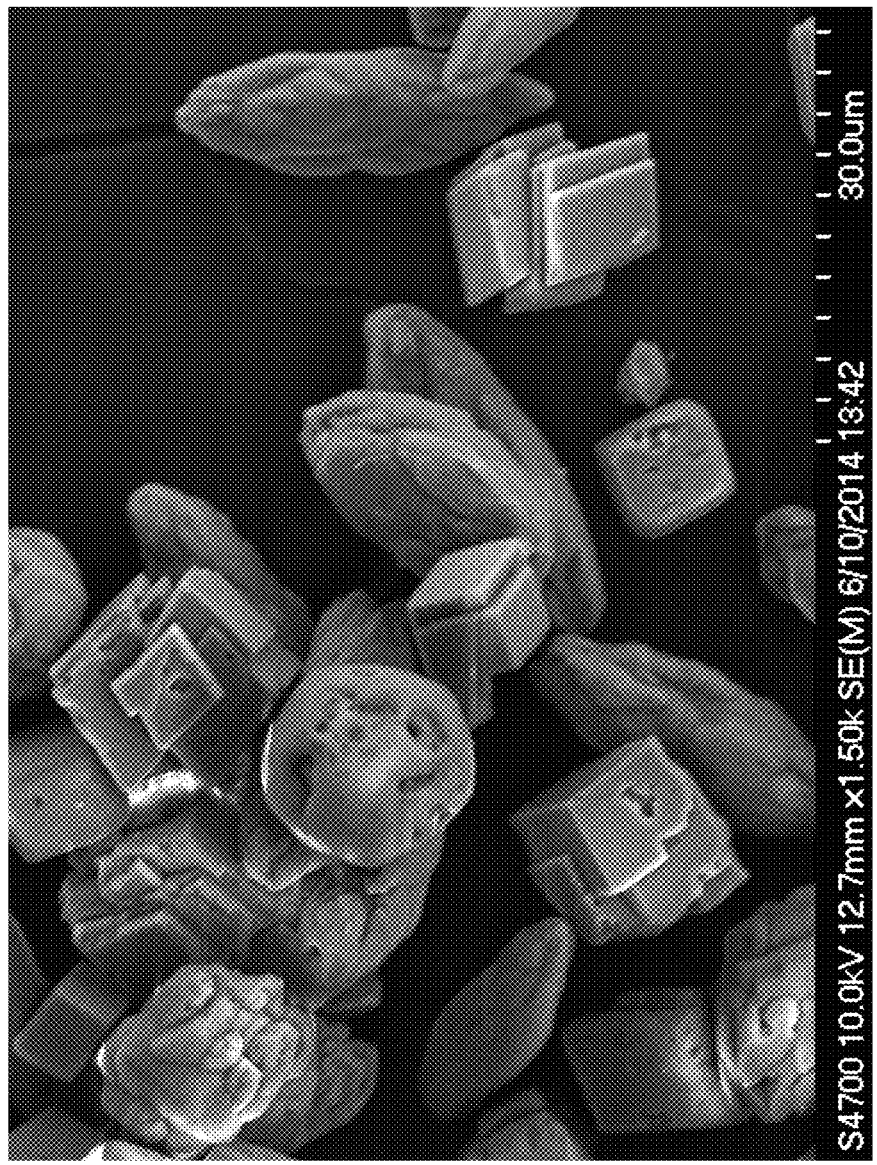
FIG. 12B illustrates SEM micrograph results of MOP treatment at 15 mg/l at 1500× magnification.
Figure 12C:
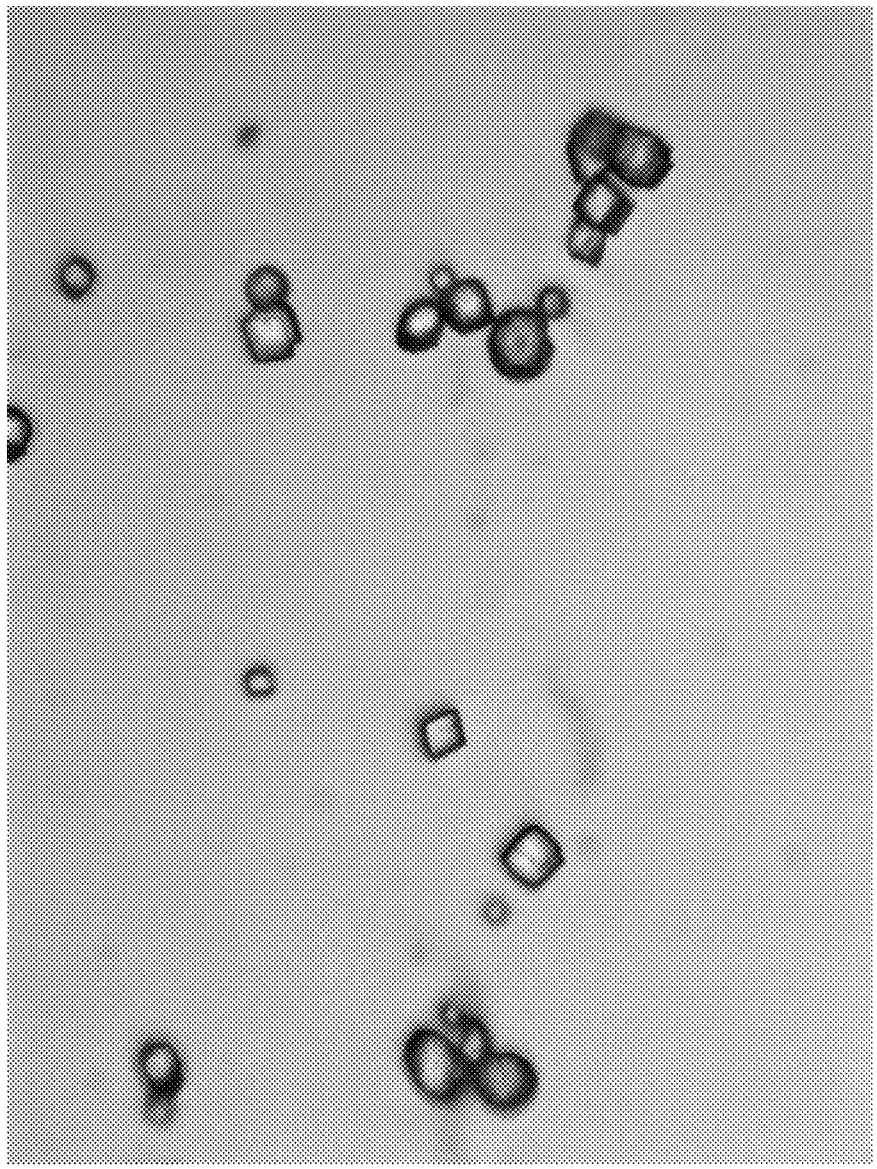
FIG. 12C illustrates compound microscopy results of MOP treatment at 30 mg/l at 40× magnification.
Figure 12D:
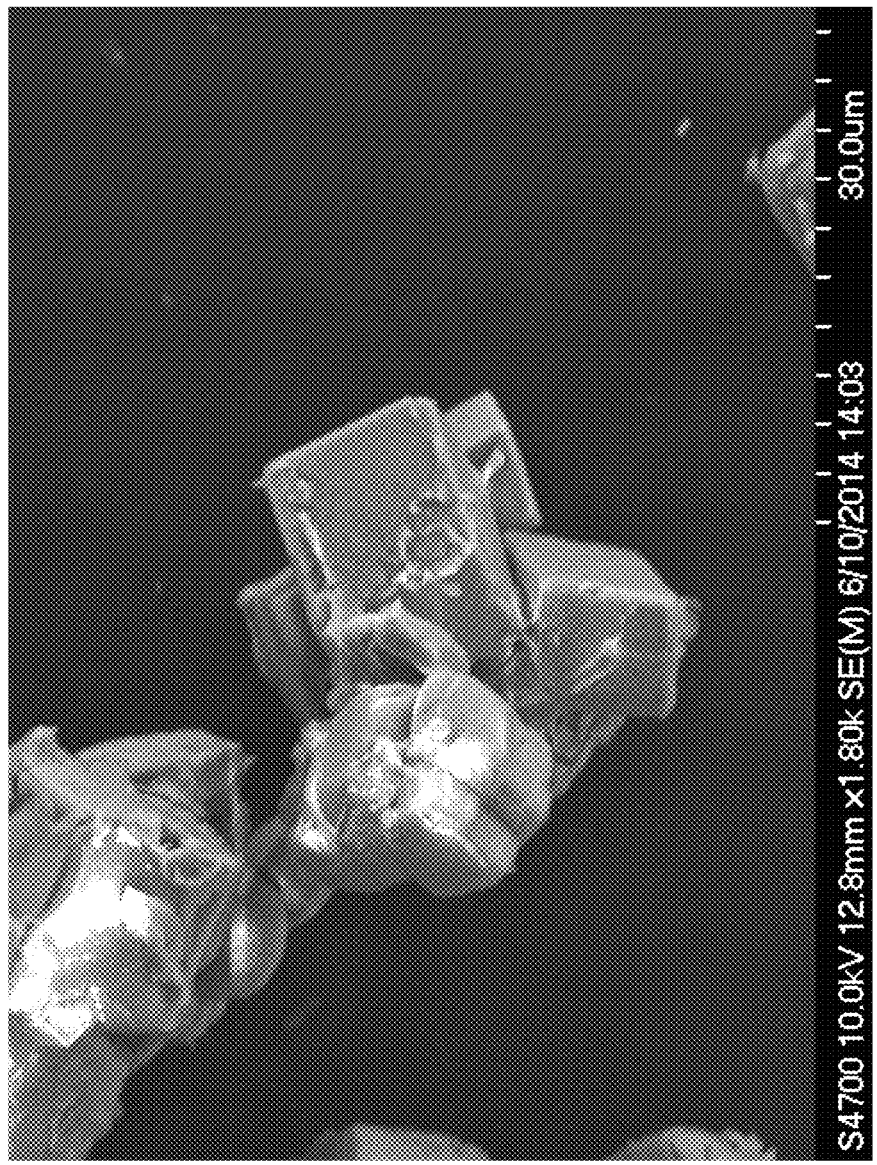
FIG. 12D illustrates SEM micrograph results of MOP treatment at 30 mg/l at 1800× magnification.

As noted, in the treatment industry PMA is a widely recognized crystal habit modifier to cubic calcium carbonate (calcite.) As can be observed in FIGS. 11A-11d, with PMA both polymer dosages "soften" the calcite and begin showing modifications features. Yet the presence of unmodified calcite is prominent in the 15 mg/l dosage (FIGS. 11A-11B) and is still observable at the 30 mg/l treatment level (FIGS. 11C-11D). At both dosages, the crystal modification achieved by PMA manifests as a "boulder" type shape.

Multifunctional One Polymers (MOP) are relatively newer polymers which are designed for multiple-use purposes rather than specific performance as crystal habit modifiers. FIGS. 12A-12D show that MOP does not demonstrate the same level of crystal modification as compared to PMA in FIGS. 11A-11D. At both the 15 mg/l and 30 mg/l dosages, the MOP-treated samples retain much of their original, untreated cubic form. A potential explanation for this could be the polymer architecture and design. Typical MOP materials are 2,000-3,000 Mw and contain sulfonated monomers. These design features may limit the interaction of the polymer with forming calcite crystalloids and thus reduce the overall level of observed crystal habit modification.

Figure 13A:
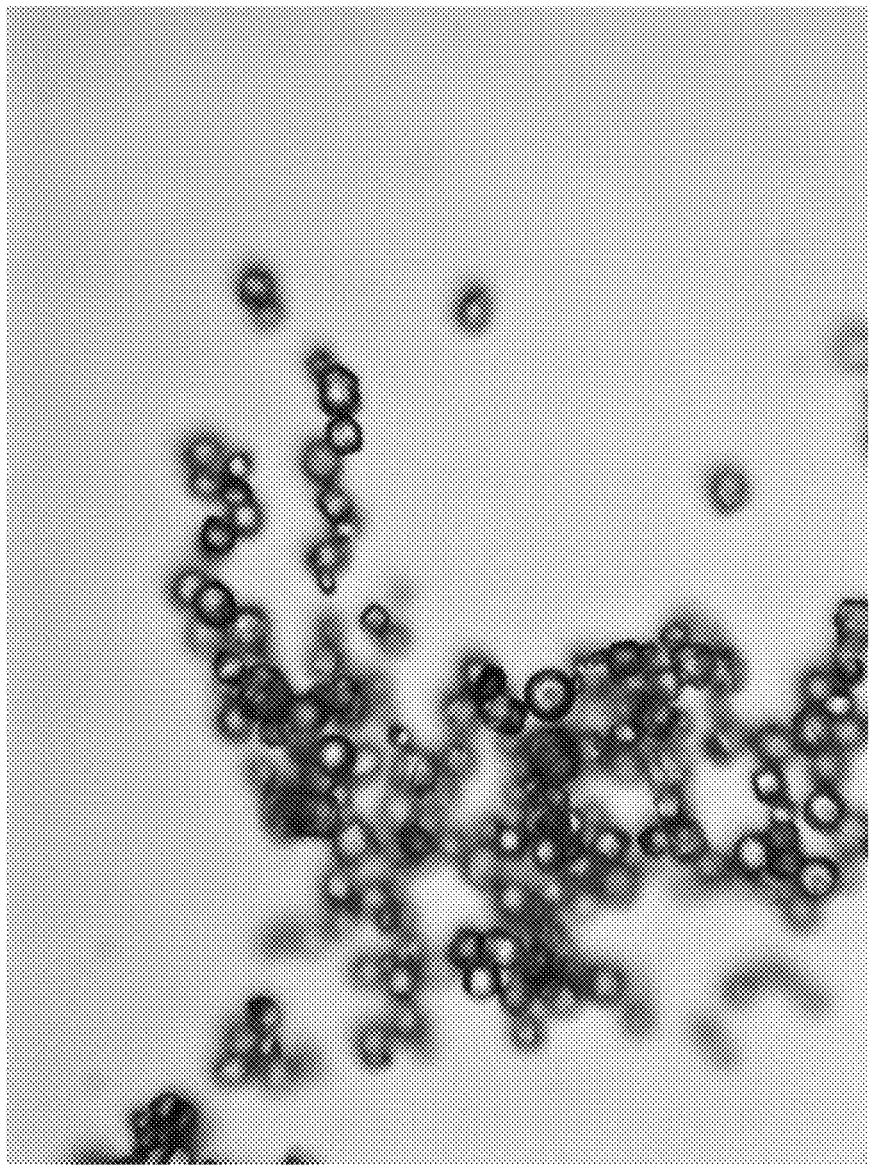
FIG. 13A illustrates compound microscopy results of treatment at 15 mg/l using an enhanced copolymer at 40× magnification.
Figure 13B:
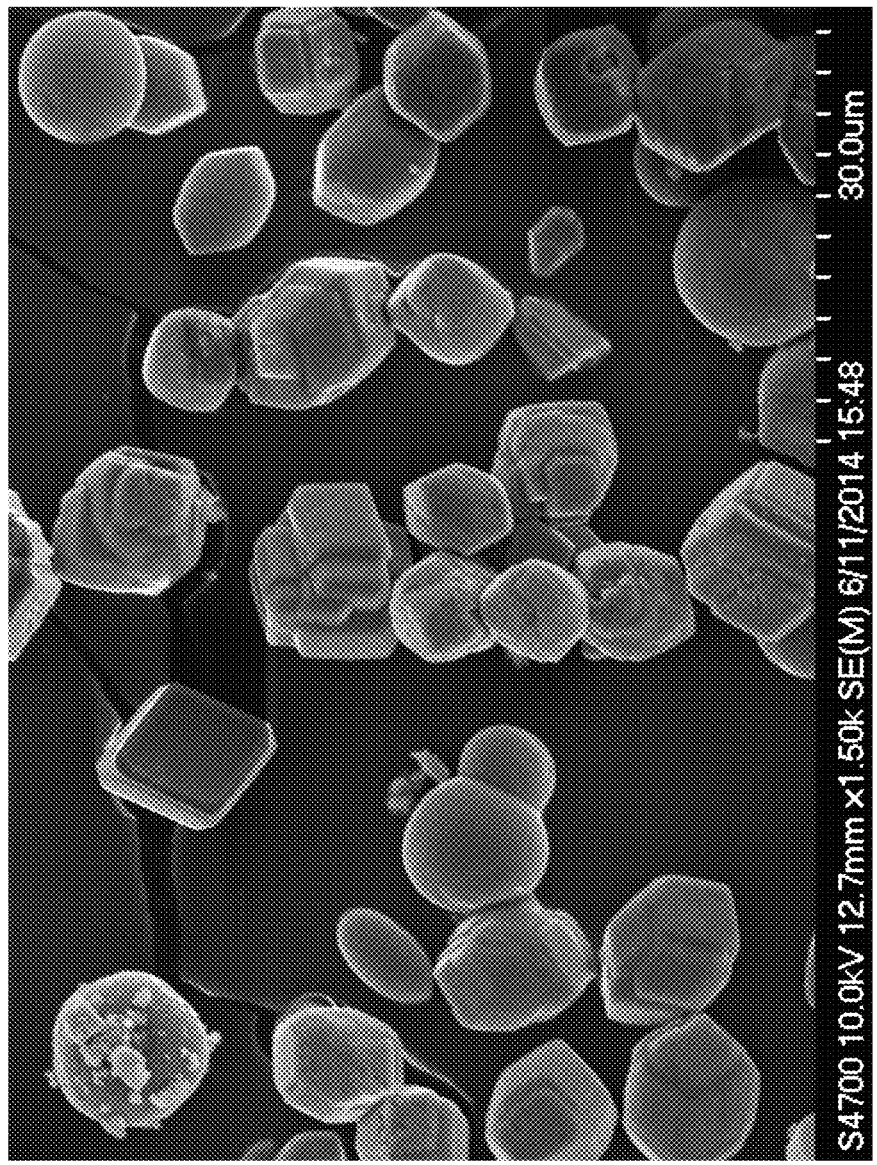
FIG. 13B illustrates SEM micrograph results of treatment at 15 mg/l using an enhanced copolymer at 1500× magnification.
Figure 13C:
FIG. 13C illustrates compound microscopy results of treatment at 30 mg/l using an enhanced copolymer at 40× magnification.
Figure 13D:
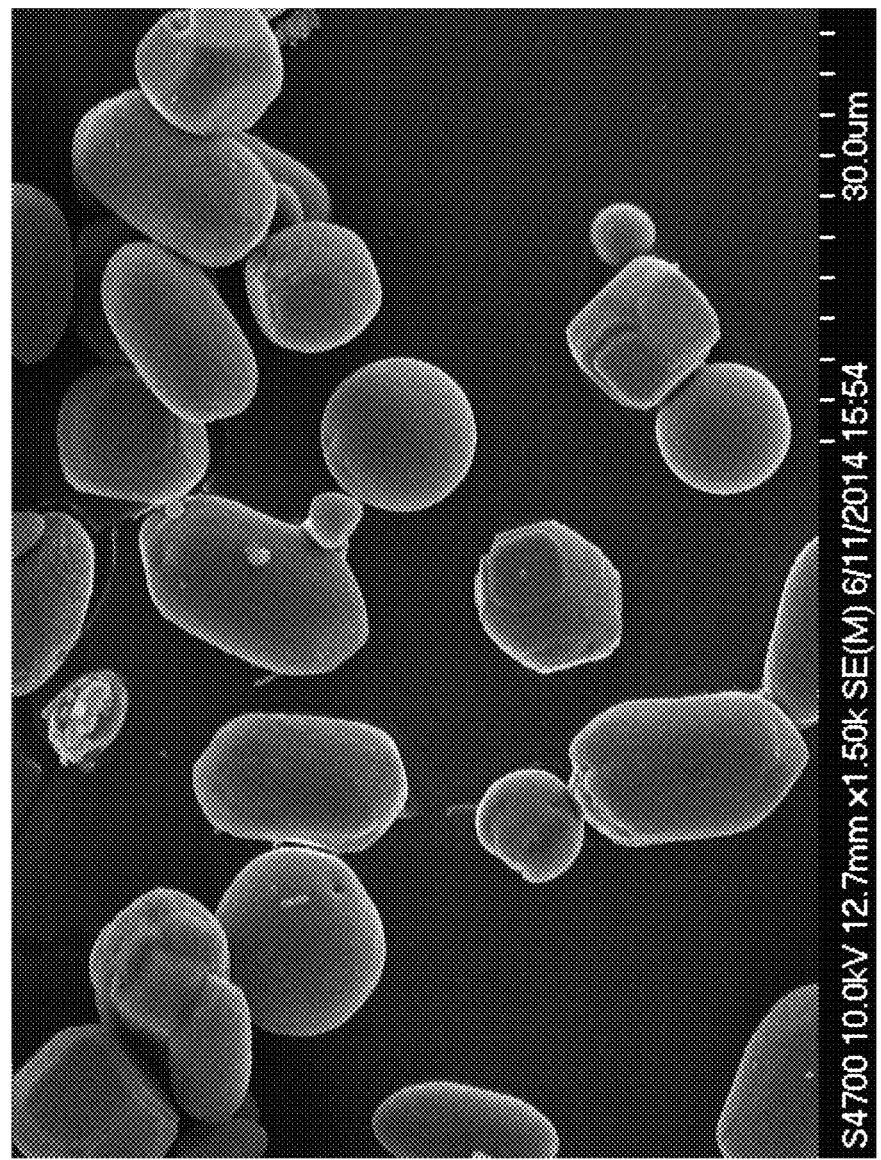
FIG. 13D illustrates SEM micrograph results of treatment at 30 mg/l using an enhanced copolymer at 1500× magnification.

As represented in FIGS. 13A-13D, the degree, type, and quality of crystal distortion observed with an enhanced copolymer in accordance with the invention were unusual, unexpected, and unmatched by either the PMA or MOP polymers. Distinctive to such enhanced copolymers is the formation of spherical and rounded pill-shaped macro structures. Such structures are less likely to form strong adhesions onto metal surfaces, and require less mechanical energy to remove when they are deposited (see FIGS. 5A-5B). Remarkably, it can be observed that an enhanced copolymer even shows a greater degree of crystal distortion at lower treatment levels. FIGS. 13A-13B show an enhanced copolymer at a dosage of 15 mg/l, with resulting crystal distortion of over 50% of the potential cubic macro-lattices. Further, FIGS. 13C-13D show widespread crystal distortion of potential cubic macro-lattices at the 30 mg/l dosage.

Figure 14:
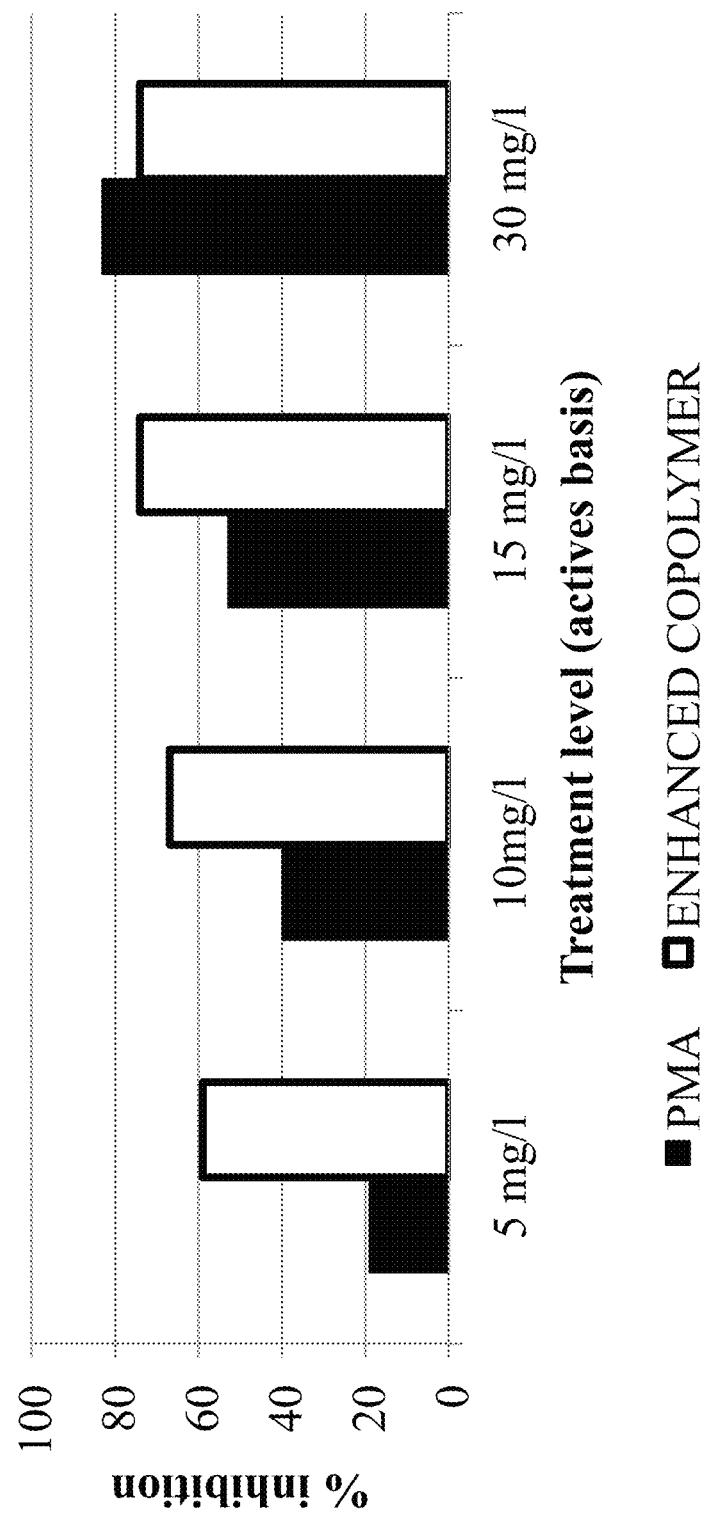
FIG. 14 is a chart comparing threshold inhibition performance between PMA and an enhanced copolymer under severe calcium test conditions.

Targeted crystal habit modification performance, as discussed above, can also yield improved performance in related functional mechanisms of scale management. A comparison of PMA and an enhanced copolymer in accordance with the invention, as threshold inhibitors, was conducted using a "Severe Calcium" laboratory bottle testing method, with the results summarized in the chart depicted in FIG. 14. In this method, 50 ml of a solution containing 1200 mg/l $Ca^{2+}$ was added to a French square bottle and treated with the indicated polymer dosage (as active). Then 50 ml of solution containing sodium carbonate (150 mg/l as $CO_3^{2-}$), sodium bicarbonate (450 mg/l as $CO_3^{2-}$), and a borate buffer (98 mg/l $B_4O_7^{2}$) was added to the calcium/polymer solution. All samples had a measured pH of ~9.0 and were capped and placed in a water bath at 50° C. for 18 hours. The Langelier Saturation Index was calculated to be ~3.0. In this evaluation, PMA and the enhanced copolymer were compared across increasing dosages of 5, 10, 15, and 30 mg/l on an active polymer basis. Within this severe calcium test, the enhanced copolymer demonstrates good stability in harsh conditions (high calcium, high alkalinity) and shows strong functionality as a threshold inhibitor, with better results than PMA at the lower treatment levels and slightly lower results at the 30 mg/l dosage. The inherent limitations of bottle testing for calcium carbonate inhibition and the small sampling of data suggest that more testing should be performed to evaluate boundaries of the enhanced copolymer's performance as a threshold inhibitor. As with PMA or any other inhibitor of this type, it may be recommended that such enhanced copolymers be formulated with PBTC (preferred) or HEDP to further enhance threshold inhibition functionality. A recommended ratio may be 3:1 copolymer to PBTC with a typical delivery 10 mg/l active polymer and 3 mg/l active PBTC as a starting point for many applications.

In an embodiment of the invention, an enhanced copolymer is prepared in-situ as a substantially maleic acid copolymer by polymerizing maleic acid monomer components. The maleic acid monomer components are transformed into monomeric repeating units within each polymer molecule. Preferably, this is aqueous polymerization, a process known in the art, which may provide various advantages such as being more economical than alternate methods of polymerization, yielding a polymer with lower aquatic toxicity, etc. An additional and previously under-appreciated advantage of aqueous polymerization is that it can provide a superior environment for beneficial in-situ copolymerization, such as producing improved copolymers exhibiting superior crystal habit modification properties. Contrary to common practice and understanding, rather than attempting to minimize decarboxylation during the polymerization process, there is preferably an effort to increase decarboxylation. This may be achieved, e.g., by changing various process parameters such as reaction temperature, the concentration of metal catalyst used, the concentration of hydrogen peroxide used, or adjusting other reaction additives. A result of increased decarboxylation is that, during the polymerization process, some of the maleic acid monomer components become non-carboxylated monomeric repeating units of the polymer being formed, resulting in an in-situ created copolymer rather than a substantially pure homopolymer. Preferably the process also gives rise to terminal hydroxyl groups in the copolymer.

Thus, the copolymer includes a quantity of non-functionalized groups which may, in application, aid in the adsorption of the polymer onto a crystal surface. An enhanced polymaleic acid copolymer prepared in such a manner may preferably include mono-carboxylic acids, non-ionic functional groups, and terminal hydroxyl groups in proportions to achieve the desired treatment functionalities. For example, such a copolymer may include at least approximately 10% (Mw) polymaleic acid and at least approximately 10% (Mw) of in-situ formed co-monomers, including at least 10% (Mw) decarboxylated maleic acid.

Figure 15:
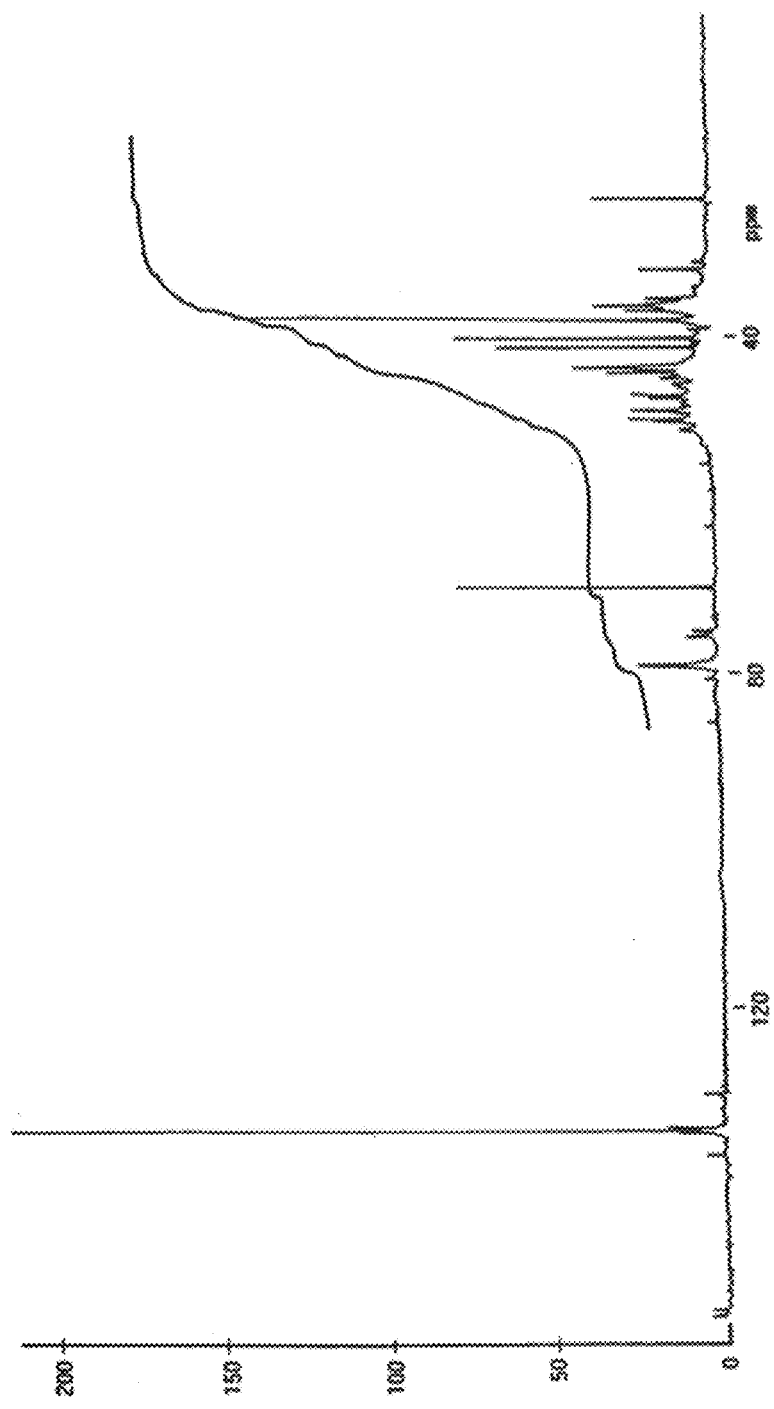
FIG. 15 is a nuclear magnetic resonance (NMR) spectrograph of a prior art material, as copied from U.S. Pat. No. 5,135,677 (Yamaguchi et al).
Figure 16:
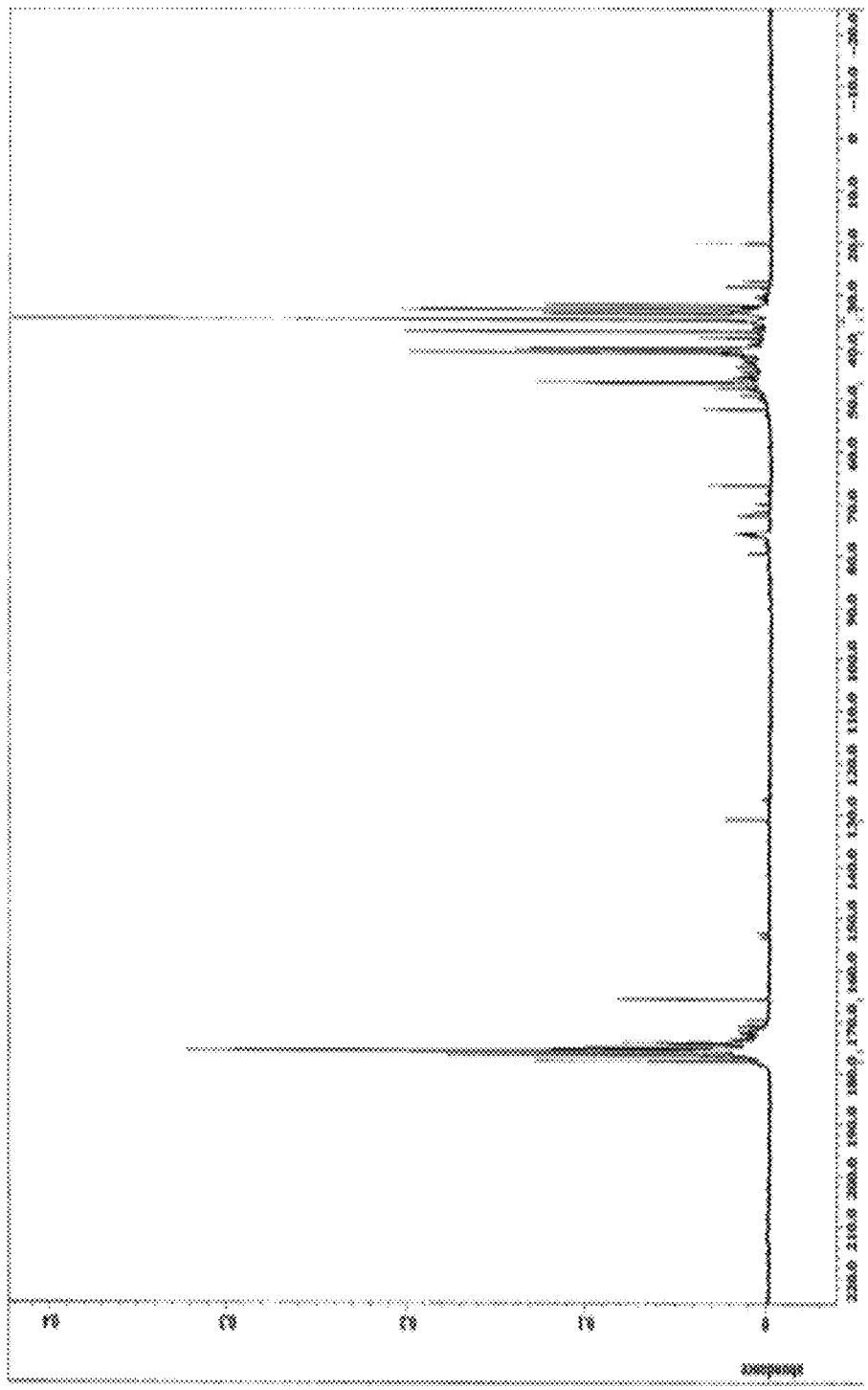
FIG. 16 is an NMR spectrograph of an enhanced copolymer.

FIGS. 15 and 16 are nuclear magnetic resonance (NMR) spectrographs characterizing the chemical properties of two polymer additives. Comparing FIG. 15 (prior art) with FIG. 16 (enhanced copolymer) shows a significantly higher proportion of decarboxylated monomeric repeating units in the enhanced copolymer. In illustrative preferred embodiments of the enhanced copolymer described in FIG. 17, with molecular weight of the combined copolymer between 300 and 3,000 Daltons, copolymer constituent proportions are specified as follows:

Maleic Acid is present at over 50 molar %
Maleic Anhydride may be present at up to 5 molar %
Acrylic Acid is present at up to 50 molar %
a 2-carbon alkane group is present at up to 50 molar %

A copolymer prepared in accordance with the principles disclosed herein, or characterized by the attributes disclosed herein, as a further embodiment of the invention may then be applied to an aqueous system as a treatment additive to prevent or remediate mineral scaling. In application, the copolymer may, among other functionalities, adsorb onto crystalloid or crystal lattice structures, with a result of modifying the crystal habit of, e.g., an undesirable inorganic compound. Some examples of such compounds include calcium carbonate, calcium sulfate, barium sulfate, calcium oxalate, calcium phosphate, silica, or silicates.

Composition components (supplied or produced in-situ during polymerization) used in preparing an improved copolymer in accordance with embodiments of the invention may be selected and adjusted in ratios intended to optimize a single functional mechanism for scale control (preferably the mechanism of crystal habit modification), or to achieve a desired balance of multiple mechanisms. For example, ratios of carboxylates, sulfonates, and non-ionic compounds may be adjusted so that the ratio of non-ionic compounds is selected to optimize polymer adsorption on crystal surfaces, while the ratios of carboxylates and sulfonates are selected to retain adequate threshold inhibition, chelation, and sequestration properties of the copolymer additive.

Many modifications or expansions upon the invention and the various illustrative embodiments described in this application still fall within the spirit and scope of the invention, and should be so considered.

The claimed invention is:

1. A method for modifying crystal formation of an inorganic compound in an aqueous system comprising:
adding to the aqueous system a polymaleic acid copolymer having at least 5 molar % decarboxylated maleic acid repeating units which disrupts the formation of crystals of at least one inorganic compound in the aqueous system.

2. The method according to claim 1, wherein the aqueous system is selected from the group consisting of industrial water systems, boilers, cooling towers, evaporators, digestors, membranes, thermal desalination systems, recreational water systems, swimming pools, spas, hot tubs, decorative fountains, potable water systems, reverse osmosis membranes, filtration systems, top-side oil systems, down-hole oil systems, top-side gas systems, down-hole gas systems, squeeze treatments, flood treatments, drilling systems, fracturing applications, mining systems, pulp-and-paper systems, sugar evaporators, ethanol evaporators, household cleaning systems, laundry systems, and textile processing systems.

3. The method according to claim 1, wherein the polymaleic acid copolymer comprises:
mono-carboxylic acids,
terminal hydroxyl groups, and
non-ionic functional groups which aid in adsorption onto a crystal surface,
wherein said non-ionic functional groups and said terminal hydroxyl groups are formed during an aqueous polymerization process, so that said copolymer comprises at least approximately 50 molar % maleic acid and up to 50 molar % free radical polymerized co-monomers.

4. The method according to claim 1, wherein the inorganic compound is selected from the group consisting of calcium carbonate, calcium sulfate, barium sulfate, strontium sulfate, calcium fluoride, calcium oxalate, calcium phosphate, an iron oxide, an iron hydroxide, silica, and a silicate.

5. The method according to claim 1, wherein modifying the crystal habit of the inorganic compound comprises adsorbing the polymaleic acid copolymer onto a surface of a forming crystal.

6. The method according to claim 5, wherein adsorbing the polymaleic acid copolymer onto the surface of the forming crystal blocks at least one dimension of directional growth of a crystal lattice of the forming crystal.

7. The method according to claim 5, wherein adsorbing the polymaleic acid copolymer onto the surface of the forming crystal alters a size and a shape of crystals that precipitate from the aqueous system.

8. The method according to claim 5, wherein adsorbing the polymaleic acid copolymer onto the surface of the forming crystal results in at least partial dissolution of a resulting crystal lattice and at least partial solubilization of mineral scale in the aqueous system.

9. The method according to claim 5, wherein adsorbing the polymaleic acid copolymer onto the surface of the forming crystal reduces a number of planar faces on crystals that precipitate from the aqueous system.

10. The method according to claim 5, wherein adsorbing the polymaleic acid copolymer onto the surface of the forming crystal reduces a surface area of planar faces on crystals that precipitate from the aqueous system.

11. The method according to claim 5, wherein adsorbing the polymaleic acid copolymer onto the surface of the forming crystal produces a rounded crystal that exhibits a lower contact area with a receiving surface, thereby hindering adhesion.

* * * * *